US010491340B2

(12) United States Patent
Guan et al.

(10) Patent No.: US 10,491,340 B2
(45) Date of Patent: *Nov. 26, 2019

(54) FEEDBACK INFORMATION TRANSMISSION METHOD IN COMMUNICATIONS SYSTEM AND APPARATUS

(71) Applicant: Huawei Technologies Co., Ltd., Shenzhen (CN)

(72) Inventors: Lei Guan, Beijing (CN); Sha Ma, Beijing (CN); Zhiyu Yan, Shenzhen (CN); Yan Cheng, Beijing (CN); Xiaobo Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,473

(22) Filed: Jan. 9, 2019

(65) Prior Publication Data

US 2019/0149277 A1 May 16, 2019

Related U.S. Application Data

(63) Continuation of application No. 15/663,378, filed on Jul. 28, 2017, now Pat. No. 10,225,050, which is a (Continued)

(51) Int. Cl.

*H04L 1/18* (2006.01)
*H04L 5/00* (2006.01)
*H04W 72/04* (2009.01)

(52) U.S. Cl.

CPC .............. *H04L 1/1861* (2013.01); *H04L 1/18* (2013.01); *H04L 5/0055* (2013.01); *H04W 72/042* (2013.01); *H04W 72/0413* (2013.01)

(58) Field of Classification Search

CPC .. H04W 72/0413; H04W 72/042; H04L 1/18; H04L 1/1861; H04L 5/0055

See application file for complete search history.

(56) References Cited

U.S. PATENT DOCUMENTS 8,837,619 B2 * 9/2014 Shin ...................... H04B 7/024 370/252
9,271,283 B2 2/2016 You et al.
(Continued)

FOREIGN PATENT DOCUMENTS

CN 10772031 A 7/2010
CN 101917259 A 12/2010
(Continued)

OTHER PUBLICATIONS

3rd Generation Partnership Project;Technical Specification Group Radio Access Network;Evolved Universal Terrestrial Radio Access (E-UTRA); Multiplexing and channel coding (Release 12), 3GPP TS 36.212 V12.3.0 (Dec. 2014), 89 pages.
(Continued)

*Primary Examiner* — Dominic E Rego
(74) *Attorney, Agent, or Firm* — Slater Matsil, LLP

(57) ABSTRACT

Embodiments of the present disclosure provide a feedback information transmission method in a communications system and an apparatus. In this method, UE may determine a codebook size of the feedback information according to a status of a downlink subframe scheduled by the base station.

20 Claims, 3 Drawing Sheets

User equipment UE receives downlink data — S101

The UE determines an uplink subframe used for feeding back feedback information corresponding to the downlink data, and determines a first downlink subframe set associated with the uplink subframe — S102

The UE determines a codebook size of the feedback information, and the codebook size is a first codebook size or a second codebook size — S103

The UE encodes the feedback information according to the codebook size, to obtain encoded feedback information — S104

The UE maps the encoded feedback information to a physical uplink shared channel PUSCH, and sends the encoded feedback information to a base station in the uplink subframe by using the PUSCH — S105

Related U.S. Application Data continuation of application No. PCT/CN2015/071957, filed on Jan. 30, 2015.

(56) References Cited

U.S. PATENT DOCUMENTS

| | | | | |
|---|---|---|---|---|
| 9,391,681 | B2 | 7/2016 | Wang et al. | |
| 2002/0102948 | A1 | 8/2002 | Stanwood et al. | |
| 2004/0095907 | A1* | 5/2004 | Agee | H04B 7/0417 370/334 |
| 2008/0013490 | A1* | 1/2008 | Laroia | H04W 72/042 370/331 |
| 2008/0014975 | A1 | 1/2008 | Jin et al. | |
| 2011/0205930 | A1 | 8/2011 | Rahman et al. | |
| 2011/0268059 | A1* | 11/2011 | Li | H04L 1/1861 370/329 |
| 2012/0087028 | A1 | 4/2012 | Cook | |
| 2012/0102948 | A1* | 5/2012 | Nuel | F02G 1/043 60/641.2 |
| 2012/0207108 | A1 | 8/2012 | Larsson et al. | |
| 2012/0276909 | A1 | 11/2012 | Xiao et al. | |
| 2013/0003788 | A1 | 1/2013 | Marinier et al. | |
| 2013/0051373 | A1 | 2/2013 | Ro et al. | |
| 2013/0301435 | A1 | 11/2013 | Panah et al. | |
| 2014/0036814 | A1 | 2/2014 | Zhang et al. | |
| 2014/0044044 | A1 | 2/2014 | Josiam et al. | |
| 2014/0078919 | A1 | 3/2014 | Hammarwall | |
| 2014/0119228 | A1 | 5/2014 | Wang et al. | |
| 2014/0153536 | A1* | 6/2014 | Ouchi | H04W 52/146 370/329 |
| 2014/0293909 | A1* | 10/2014 | Xu | H04B 7/2656 370/329 |
| 2015/0016389 | A1 | 1/2015 | Baldemair et al. | |
| 2015/0085787 | A1 | 3/2015 | Ouchi | |
| 2015/0146561 | A1 | 5/2015 | Jung et al. | |
| 2015/0201346 | A1 | 7/2015 | Wu et al. | |
| 2016/0043842 | A1 | 2/2016 | Gong et al. | |
| 2016/0065278 | A1 | 3/2016 | Wang et al. | |
| 2016/0112173 | A1 | 4/2016 | Wang et al. | |
| 2017/0005740 | A1 | 1/2017 | Yang et al. | |
| 2017/0093469 | A1* | 3/2017 | Nayeb Nazar | H04W 72/04 |

FOREIGN PATENT DOCUMENTS

| | | | |
|---|---|---|---|
| CN | 102684850 | A | 9/2012 |
| CN | 102857279 | A | 1/2013 |
| CN | 102869105 | A | 1/2013 |
| CN | 103220101 | A | 7/2013 |
| CN | 103312468 | A | 9/2013 |
| CN | 104243108 | A | 12/2014 |
| CN | 103703815 | B | 10/2017 |
| EP | 2693823 | A2 | 2/2014 |
| EP | 2717621 | A1 | 4/2014 |
| JP | 2011259125 | A | 12/2011 |
| JP | 2013520851 | A | 6/2013 |
| JP | 2014502129 | A | 1/2014 |
| JP | 2014528662 | A | 10/2014 |
| RU | 2496243 | C2 | 10/2013 |
| WO | 2012124552 | A1 | 9/2012 |
| WO | 2012153976 | A2 | 11/2012 |
| WO | 2013113361 | A1 | 8/2013 |
| WO | 2013138021 | A1 | 9/2013 |
| WO | 2013145552 | A1 | 10/2013 |
| WO | 2013184613 | A2 | 12/2013 |
| WO | 2014003456 | A1 | 1/2014 |
| WO | 2014007512 | A1 | 1/2014 |
| WO | 2014018984 | A1 | 1/2014 |
| WO | 2014047797 | A1 | 4/2014 |
| WO | 2014179990 | A1 | 11/2014 |
| WO | 2014179991 | A1 | 11/2014 |
| WO | 2014025699 | A1 | 12/2014 |

OTHER PUBLICATIONS

3rd Generation Partnership Project;Technical Specification Group Radio Access Network;Evolved Universal Terrestrial Radio Access (E-UTRA); Physical layer procedures (Release 12), 3GPP TS 36.213 V12.4.0 (Dec. 2014), 225 pages.

Catt, “Remaining issues for TDD ACK/NACK transmission,” 3GPP TSG RAN WG1 Meeting #64,R1-110705, Taipei, Taiwan, Feb. 21-25, 2011, 3 pages.

Nokia, et al., “New WI proposal: LTE Carrier Aggregation Enhancement Beyond 5 Carriers,” 3GPP TSG RAN Meeting #66 RP-142286, Maui, Hawaii, US, Dec. 8-11, 2014, 9 pages.

3GPP TS 36.212 V12.0.0 (Dec. 2013); 3rd Generation Partnership Project; Technical Specification Group Radio Access Network; Evolved Universal Terrestrial Radio Access (E-UTRA); Multiplexing and channel coding (Release 12); 88 pages.

Huawei, et al., “WF on Antenna Model in 3D Channel Modeling”, 3GPP TSG RAN WG1 #72bis, Chicago, USA, Apr. 15-19, 2013, Agenda Item: 7.2.6.1, R1-131761, 7 pages.

* cited by examiner

FEEDBACK INFORMATION TRANSMISSION METHOD IN COMMUNICATIONS SYSTEM AND APPARATUS

CROSS-REFERENCE TO RELATED APPLICATIONS

This application is a continuation of U.S. patent application Ser. No. 15/663,378, filed on Jul. 28, 2017, which is a continuation of International Application No. PCT/CN2015/071957, filed on Jan. 30, 2015. All of the afore-mentioned patent applications are hereby incorporated by reference in their entireties.

TECHNICAL FIELD

Embodiments of the present disclosure relate to communications technologies, and in particular, to a feedback information transmission method in a communications system and an apparatus.

BACKGROUND

Currently, a hybrid automatic repeat request (HARQ) mechanism is usually used in a Long term Evolution (LTE) system. Specifically, after user equipment (UE) receives downlink data using a physical downlink shared channel (PDSCH), if the UE can correctly receive the downlink data, the UE sends acknowledgment (ACK) information to a base station using a physical uplink control channel (PUCCH); or if the UE cannot correctly receive the downlink data, the UE sends negative acknowledgment (NACK) information to the base station using a PUCCH. When the UE further needs to send, in an uplink subframe in which the UE sends the ACK/NACK information, uplink data, to maintain an uplink single-carrier characteristic of the LTE system and improve efficiency of uplink transmit power, the UE maps the ACK/NACK information and the uplink data to a physical uplink shared channel (PUSCH), and sends both the ACK/NACK information and the uplink data to the base station.

In addition, the LTE system further supports a carrier aggregation (CA) technology. That is, the base station configures at least two carriers for same UE, to improve a data transmission rate of the UE. The at least two carriers include one primary component carrier and at least one secondary component carrier. A PUCCH sending mode in a CA mode includes a channel selection mode and a PUCCH format 3. The channel selection mode supports CA of a maximum of two carriers, and the PUCCH format 3 mode can support CA of five carriers, or can support transmission of a maximum of about 20 ACK/NACK bits. Therefore, when the UE further needs to send, in the uplink subframe in which the UE sends the ACK/NACK information, the uplink data, the PUSCH can carry a maximum of about 20 ACK/NACK bits.

With further evolution of an LTE technology, a PUSCH may need to carry ACK/NACK information of more bits. Therefore, how to enable a PUSCH to carry ACK/NACK information of more bits is a technical problem to be resolved in the present disclosure.

SUMMARY

Embodiments of the present disclosure provide a feedback information transmission method in a communications system and apparatus, so as to enable a PUSCH to carry ACK/NACK information of more bits, and reduce resource overheads.

According to a first aspect, an embodiment of the present disclosure provides a feedback information transmission method in a communications system. The method includes receiving, by user equipment (UE), downlink data. The method also includes determining, by the UE, an uplink subframe used for feeding back feedback information corresponding to the downlink data, and determining a first downlink subframe set associated with the uplink subframe, where the first downlink subframe set includes a first subset and a second subset, and the first subset is a proper subset of the second subset. The method also includes determining, by the UE, a codebook size of the feedback information, where the codebook size is a first codebook size or a second codebook size, the first codebook size is corresponding to a quantity of downlink subframes included in the first subset, and the second codebook size is corresponding to a quantity of downlink subframes included in the second subset. The method also includes encoding, by the UE, the feedback information according to the codebook size, to obtain encoded feedback information. The method also includes mapping, by the UE, the encoded feedback information to a physical uplink shared channel (PUSCH), and sending the encoded feedback information to the base station in the uplink subframe using the PUSCH.

With reference to the first aspect, in a first possible implementation manner of the first aspect, the determining, by the UE, a codebook size of the feedback information includes: if the UE receives first indication information sent by the base station, and the first indication information indicates the first codebook size, determining, by the UE, that the codebook size of the feedback information is the first codebook size; or if the UE receives first indication information sent by the base station, and the first indication information indicates the second codebook size, determining, by the UE, that the codebook size of the feedback information is the second codebook size; or if the UE does not receive first indication information, determining, by the UE, that the codebook size of the feedback information is the first codebook size.

With reference to the first aspect, in a second possible implementation manner of the first aspect, the determining, by the UE, a codebook size of the feedback information includes: if the UE receives second indication information sent by the base station, and the second indication information indicates the first codebook size, determining, by the UE, that the codebook size of the feedback information is the first codebook size; or if the UE receives second indication information sent by the base station, and the second indication information indicates the second codebook size, determining, by the UE, that the codebook size of the feedback information is the second codebook size; or if the UE does not receive second indication information, determining, by the UE, that the codebook size of the feedback information is a predefined codebook size, where the predefined codebook size is the first codebook size or the second codebook size.

With reference to the first aspect, in a third possible implementation manner of the first aspect, the determining, by the UE, a codebook size of the feedback information includes: if the UE receives first indication information and second indication information that are sent by the base station, and the first indication information and the second indication information indicate the first codebook size, determining, by the UE, that the codebook size of the feedback information is the first codebook size; or if the UE receives first indication information and second indication information that are sent by the base station, and the first indication information and the second indication information indicate the second codebook size, determining, by the UE, that the codebook size of the feedback information is the second codebook size; or if the UE does not receive first indication information, determining, by the UE, that the codebook size of the feedback information is the first codebook size; or if the UE does not receive first indication information but receives second indication information, determining, by the UE, that the codebook size of the feedback information is the first codebook size or the second codebook size indicated by the second indication information; or if the UE neither receives first indication information nor receives second indication information, determining, by the UE, that the codebook size of the feedback information is the first codebook size.

With reference to any one of the first aspect, or the possible implementation manners of the first aspect, in a fourth possible implementation manner of the first aspect, the receiving, by UE, downlink data includes: receiving, by the UE in a downlink subframe scheduled by the base station, the downlink data, where the downlink subframe scheduled by the base station constitutes a second downlink subframe set, and the second downlink subframe set is a subset of the first downlink subframe set; and the determining, by the UE, a codebook size of the feedback information includes: if the second downlink subframe set is a subset of the first subset, determining, by the UE, that the codebook size of the feedback information is the first codebook size; or if the second downlink subframe set includes only a downlink subframe that is in the second subset and that does not belong to the first subset, determining, by the UE, that the codebook size of the feedback information is the first codebook size or the second codebook size; or if the second downlink subframe set includes a downlink subframe in the first subset and a downlink subframe that is in the second subset and that does not belong to the first subset, and the second downlink subframe set does not include a downlink subframe beyond the first subset and the second subset, determining, by the UE, that the codebook size of the feedback information is the second codebook size.

With reference to any one of the first aspect, or the first to the fourth possible implementation manners of the first aspect, in a fifth possible implementation manner of the first aspect, before the mapping, by the UE, the encoded feedback information to a PUSCH, the method further includes: if the codebook size is the first codebook size, scrambling, by the UE, the encoded feedback information using a first scrambling code; or if the codebook size is the second codebook size, scrambling, by the UE, the encoded feedback information using a second scrambling code.

With reference to any one of the first aspect, or the possible implementation manners of the first aspect, in a sixth possible implementation manner of the first aspect, if the codebook size is the first codebook size, the encoding, by the UE, the feedback information according to the codebook size, to obtain encoded feedback information includes: encoding, by the UE, the feedback information according to the first codebook size, to obtain first encoded feedback information; and the mapping, by the UE, the encoded feedback information to a PUSCH includes: determining, by the UE, a first proportion factor configured by the base station, and determining a first quantity of symbols according to the first proportion factor, where the first quantity of symbols is a quantity of symbols that need to be occupied to map the first encoded feedback information to the PUSCH; and mapping, by the UE, the first encoded feedback information to the PUSCH according to the first quantity of symbols; or if the codebook size is the second codebook size, the encoding, by the UE, the feedback information according to the codebook size, to obtain encoded feedback information includes: encoding, by the UE, the feedback information according to the second codebook size, to obtain second encoded feedback information; and the mapping, by the UE, the encoded feedback information to a PUSCH includes: determining, by the UE, a second proportion factor configured by the base station, and determining a second quantity of symbols according to the second proportion factor, where the second quantity of symbols is a quantity of symbols that need to be occupied to map the second encoded feedback information to the PUSCH; and mapping, by the UE, the second encoded feedback information to the PUSCH according to the second quantity of symbols.

With reference to any one of the possible implementation manners of the first aspect, in a seventh possible implementation manner of the first aspect, before the receiving, by UE, downlink data, the method further includes: receiving, by the UE, downlink control information sent by the base station; and the receiving, by UE, downlink data includes: receiving, by the UE in the downlink subframe scheduled by the base station, the downlink data according to the downlink control information, where the first indication information is information in the downlink control information.

With reference to any one of the possible implementation manners of the first aspect, in an eighth possible implementation manner of the first aspect, the second indication information is information in uplink scheduling information used for scheduling the PUSCH.

According to a second aspect, an embodiment of the present disclosure provides a feedback information transmission method in a communications system. The method includes sending, by a base station, downlink data to user equipment (UE). The method also includes determining, by the base station, an uplink subframe used for receiving feedback information that is sent by the UE and that is corresponding to the downlink data, where a first downlink subframe set associated with the uplink subframe includes a first subset and a second subset, and the first subset is a proper subset of the second subset. The method also includes determining, by the base station, a codebook size of the feedback information, where the codebook size is a first codebook size or a second codebook size, the first codebook size is corresponding to a quantity of downlink subframes included in the first subset, and the second codebook size is corresponding to a quantity of downlink subframes included in the second subset. The method also includes receiving, by the base station in the uplink subframe according to the determined codebook size of the feedback information, feedback information that is sent by the UE and that is mapped to a physical uplink shared channel (PUSCH).

With reference to the second aspect, in a first possible implementation manner of the second aspect, before the receiving, by the base station in the uplink subframe according to the determined codebook size of the feedback information, feedback information that is sent by the UE and that is mapped to a physical uplink shared channel (PUSCH), the method further includes: sending, by the base station, first indication information, to notify the UE of the determined codebook size of the feedback information; or if the base station does not send first indication information to the UE, determining, by the base station, that the codebook size of the feedback information is the first codebook size.

With reference to the second aspect, in a second possible implementation manner of the second aspect, before the receiving, by the base station in the uplink subframe according to the determined codebook size of the feedback information, feedback information that is sent by the UE and that is mapped to a physical uplink shared channel (PUSCH), the method further includes: sending, by the base station, second indication information, to notify the UE of the determined codebook size of the feedback information; or if the base station does not send second indication information to the UE, determining, by the base station, that the codebook size of the feedback information is a predefined codebook size, where the predefined codebook size is the first codebook size or the second codebook size.

With reference to the second aspect, in a third possible implementation manner of the second aspect, before the receiving, by the base station in the uplink subframe according to the determined codebook size of the feedback information, feedback information that is sent by the UE and that is mapped to a physical uplink shared channel (PUSCH), the method further includes: sending, by the base station, first indication information and second indication information, to notify the UE of the determined codebook size of the feedback information; or if the base station does not send first indication information to the UE, determining, by the base station, that the codebook size of the feedback information is the first codebook size; or if the base station does not send first indication information to the UE, sending, by the base station, second indication information, to notify the UE of the determined codebook size of the feedback information; or if the base station neither sends first indication information nor sends second indication information to the UE, determining, by the base station, that the codebook size of the feedback information is the first codebook size.

With reference to any one of the second aspect, or the possible implementation manners of the second aspect, in a fourth possible implementation manner of the second aspect, before the receiving, by the base station in the uplink subframe according to the determined codebook size of the feedback information, feedback information that is sent by the UE and that is mapped to a physical uplink shared channel (PUSCH), the method further includes: performing, by the base station, descrambling processing on a first scrambling code, where the first scrambling code is used by the UE to scramble encoded feedback information when it is determined that the codebook size of the feedback information is the first codebook size; or performing, by the base station, descrambling processing on a second scrambling code, where the second scrambling code is used by the UE to scramble encoded feedback information when it is determined that the codebook size of the feedback information is the second codebook size, where the encoded feedback information is information obtained by encoding the feedback information by the UE according to the codebook size.

With reference to any one of the second aspect, or the possible implementation manners of the second aspect, in a fifth possible implementation manner of the second aspect, before the sending, by a base station, downlink data to UE, the method further includes: sending, by the base station, downlink control information to the UE; and the sending, by a base station, downlink data to UE includes: sending, by the base station, the downlink data to the UE in a downlink subframe scheduled by the base station, where the first indication information is information in the downlink control information.

With reference to any one of the second aspect, or the possible implementation manners of the second aspect, in a sixth possible implementation manner of the second aspect, the second indication information is information in uplink scheduling information used for scheduling the PUSCH.

According to a third aspect, an embodiment of the present disclosure provides user equipment (UE). The UE includes a receiving module, configured to receive downlink data. The UE also includes a processing module, configured to: determine an uplink subframe used for feeding back feedback information corresponding to the downlink data, and determine a first downlink subframe set associated with the uplink subframe, where the downlink data is received by the receiving module, the first downlink subframe set includes a first subset and a second subset, and the first subset is a proper subset of the second subset. The processing module is further configured to determine a codebook size of the feedback information, where the codebook size is a first codebook size or a second codebook size, the first codebook size is corresponding to a quantity of downlink subframes included in the first subset, and the second codebook size is corresponding to a quantity of downlink subframes included in the second subset. The processing module is further configured to encode the feedback information according to the codebook size, to obtain encoded feedback information. The processing module is further configured to: map the encoded feedback information to a physical uplink shared channel (PUSCH), and control a sending module to send, in the uplink subframe, the encoded feedback information using the PUSCH. The UE also includes the sending module, configured to send the encoded feedback information to the base station in the uplink subframe using the PUSCH.

With reference to the third aspect, in a first possible implementation manner of the third aspect, the processing determining module is specifically configured to: if first indication information sent by the base station is received, and the first indication information indicates the first codebook size, determine that the codebook size of the feedback information is the first codebook size; or if first indication information sent by the base station is received, and the first indication information indicates the second codebook size, determine that the codebook size of the feedback information is the second codebook size; or if first indication information is not received, determine that the codebook size of the feedback information is the first codebook size.

With reference to the third aspect, in a second possible implementation manner of the third aspect, the processing module is specifically configured to: if second indication information sent by the base station is received, and the second indication information indicates the first codebook size, determine that the codebook size of the feedback information is the first codebook size; or if second indication information sent by the base station is received, and the second indication information indicates the second codebook size, determine that the codebook size of the feedback information is the second codebook size; or if second indication information is not received, determine that the codebook size of the feedback information is a predefined codebook size, where the predefined codebook size is the first codebook size or the second codebook size.

With reference to the third aspect, in a third possible implementation manner of the third aspect, the processing module is specifically configured to: if first indication information and second indication information that are sent by the base station are received, and the first indication information and the second indication information indicate the first codebook size, determine that the codebook size of the feedback information is the first codebook size; or if first indication information and second indication information that are sent by the base station are received, and the first indication information and the second indication information indicate the second codebook size, determine that the codebook size of the feedback information is the second codebook size; or if first indication information is not received, determine that the codebook size of the feedback information is the first codebook size; or if first indication information is not received, but second indication information is received, determine that the codebook size of the feedback information is the first codebook size or the second codebook size indicated by the second indication information; or if first indication information and second indication information are not received, determine that the codebook size of the feedback information is the first codebook size.

With reference to the third aspect, in a fourth possible implementation manner of the third aspect, the receiving module is specifically configured to receive, in a downlink subframe scheduled by the base station, the downlink data, where the downlink subframe scheduled by the base station constitutes a second downlink subframe set, and the second downlink subframe set is a subset of the first downlink subframe set; and the processing module is specifically configured to: if the second downlink subframe set is a subset of the first subset, determine that the codebook size of the feedback information is the first codebook size; or if the second downlink subframe set includes only a downlink subframe that is in the second subset and that does not belong to the first subset, determine that the codebook size of the feedback information is the first codebook size or the second codebook size; or if the second downlink subframe set includes a downlink subframe in the first subset and a downlink subframe that is in the second subset and that does not belong to the first subset, and the second downlink subframe set does not include a downlink subframe beyond the first subset and the second subset, determine that the codebook size of the feedback information is the second codebook size.

With reference to any one of the first to the fourth possible implementation manners of the third aspect, in a fifth possible implementation manner of the third aspect, the processing module is further configured to: if the codebook size is the first codebook size, scramble the encoded feedback information using a first scrambling code; or if the codebook size is the second codebook size, scramble the encoded feedback information using a second scrambling code.

With reference to any one of the third aspect, or the possible implementation manners of the third aspect, in a sixth possible implementation manner of the third aspect, the processing module is further configured to: if the codebook size is the first codebook size, encode the feedback information according to the first codebook size, to obtain first encoded feedback information; determine a first proportion factor configured by the base station, and determine a first quantity of symbols according to the first proportion factor, where the first quantity of symbols is a quantity of symbols that need to be occupied to map the first encoded feedback information to the PUSCH; and map the first encoded feedback information to the PUSCH according to the first quantity of symbols; or the processing module is further configured to: if the codebook size is the second codebook size, encode the feedback information according to the second codebook size, to obtain second encoded feedback information; determine a second proportion factor configured by the base station, and determine a second quantity of symbols according to the second proportion factor, where the second quantity of symbols is a quantity of symbols that need to be occupied to map the second encoded feedback information to the PUSCH; and map the second encoded feedback information to the PUSCH according to the second quantity of symbols.

With reference to any one of the third aspect, or the possible implementation manners of the third aspect, in a seventh possible implementation manner of the third aspect, the receiving module is further configured to: receive downlink control information sent by the base station; and receive, in the downlink subframe scheduled by the base station, the downlink data according to the downlink control information, where the first indication information is information in the downlink control information.

With reference to any one of the third aspect, or the possible implementation manners of the third aspect, in an eighth possible implementation manner of the third aspect, the second indication information is information in uplink scheduling information used for scheduling the PUSCH.

According to a fourth aspect, an embodiment of the present disclosure provides a base station. The base station includes a sending module, configured to send downlink data to user equipment (UE). The base station also includes a processing module, configured to determine an uplink subframe used for receiving feedback information that is sent by the UE and that is corresponding to the downlink data, where the downlink data is sent by the sending module, a first downlink subframe set associated with the uplink subframe includes a first subset and a second subset, and the first subset is a proper subset of the second subset. The processing module is further configured to determine a codebook size of the feedback information, where the codebook size is a first codebook size or a second codebook size, the first codebook size is corresponding to a quantity of downlink subframes included in the first subset, and the second codebook size is corresponding to a quantity of downlink subframes included in the second subset. The base station also includes a receiving module, configured to receive, in the uplink subframe according to the codebook size that is of the feedback information and that is determined by the processing module, feedback information that is sent by the UE and that is mapped to a physical uplink shared channel (PUSCH).

With reference to the fourth aspect, in a first possible implementation manner of the fourth aspect, the sending module is further configured to send first indication information, to notify the UE of the determined codebook size of the feedback information; or if the sending module does not send first indication information to the UE, the processing module determines that the codebook size of the feedback information is the first codebook size.

With reference to the fourth aspect, in a second possible implementation manner of the fourth aspect, the sending module is further configured to send second indication information, to notify the UE of the determined codebook size of the feedback information; or if the sending module does not send second indication information to the UE, the processing module determines that the codebook size of the feedback information is a predefined codebook size, and the predefined codebook size is the first codebook size or the second codebook size.

With reference to the fourth aspect, in a third possible implementation manner of the fourth aspect, the sending module is further configured to send first indication information and second indication information, to notify the UE of the determined codebook size of the feedback information; or if the sending module does not send first indication information to the UE, the processing module determines that the codebook size of the feedback information is the first codebook size; or if the sending module does not send first indication information to the UE, the sending module sends second indication information, to notify the UE of the determined codebook size of the feedback information; or if the sending module neither sends first indication information nor sends second indication information to the UE, the processing module determines that the codebook size of the feedback information is the first codebook size.

With reference to any one of the fourth aspect, or the possible implementation manners of the fourth aspect, in a fourth possible implementation manner of the fourth aspect, the processing module is further configured to: perform descrambling processing on a first scrambling code, where the first scrambling code is used by the UE to scramble encoded feedback information when it is determined that the codebook size of the feedback information is the first codebook size; or perform descrambling processing on a second scrambling code, where the second scrambling code is used by the UE to scramble encoded feedback information when it is determined that the codebook size of the feedback information is the second codebook size, where the encoded feedback information is information obtained by encoding the feedback information by the UE according to the codebook size.

With reference to any one of the fourth aspect, or the possible implementation manners of the fourth aspect, in a fifth possible implementation manner of the fourth aspect, the sending module is further configured to: send downlink control information to the UE, and send the downlink data to the UE in a downlink subframe scheduled by the base station, where the first indication information is information in the downlink control information.

With reference to any one of the fourth aspect, or the possible implementation manners of the fourth aspect, in a sixth possible implementation manner of the fourth aspect, the second indication information is information in uplink scheduling information used for scheduling the PUSCH.

In the embodiments of the present disclosure, user equipment (UE) receives downlink data, and the UE determines an uplink subframe used for feeding back feedback information corresponding to the downlink data, and determines a first downlink subframe set associated with the uplink subframe. The first downlink subframe set includes a first subset and a second subset, and the first subset is a proper subset of the second subset. Further, the UE determines a codebook size of the feedback information. The codebook size is a first codebook size or a second codebook size, the first codebook size is corresponding to a quantity of downlink subframes included in the first subset, and the second codebook size is corresponding to a quantity of downlink subframes included in the second subset. Further, the UE encodes the feedback information according to the codebook size, to obtain encoded feedback information, and then the UE maps the encoded feedback information to a physical uplink shared channel (PUSCH), and sends the encoded feedback information to the base station in the uplink subframe using the PUSCH. That is, the UE may determine the codebook size of the feedback information according to a status of a downlink subframe actually scheduled by the base station. In this way, a PUSCH can carry ACK/NACK information of more bits, and performance of an ACK/NACK and performance of uplink data in the PUSCH are improved when a predetermined quantity of resources are used, or resource overheads are reduced when it is ensured that performance of an ACK/NACK is the same as performance of uplink data in the PUSCH.

DETAILED DESCRIPTION OF ILLUSTRATIVE EMBODIMENTS

Figure 1:
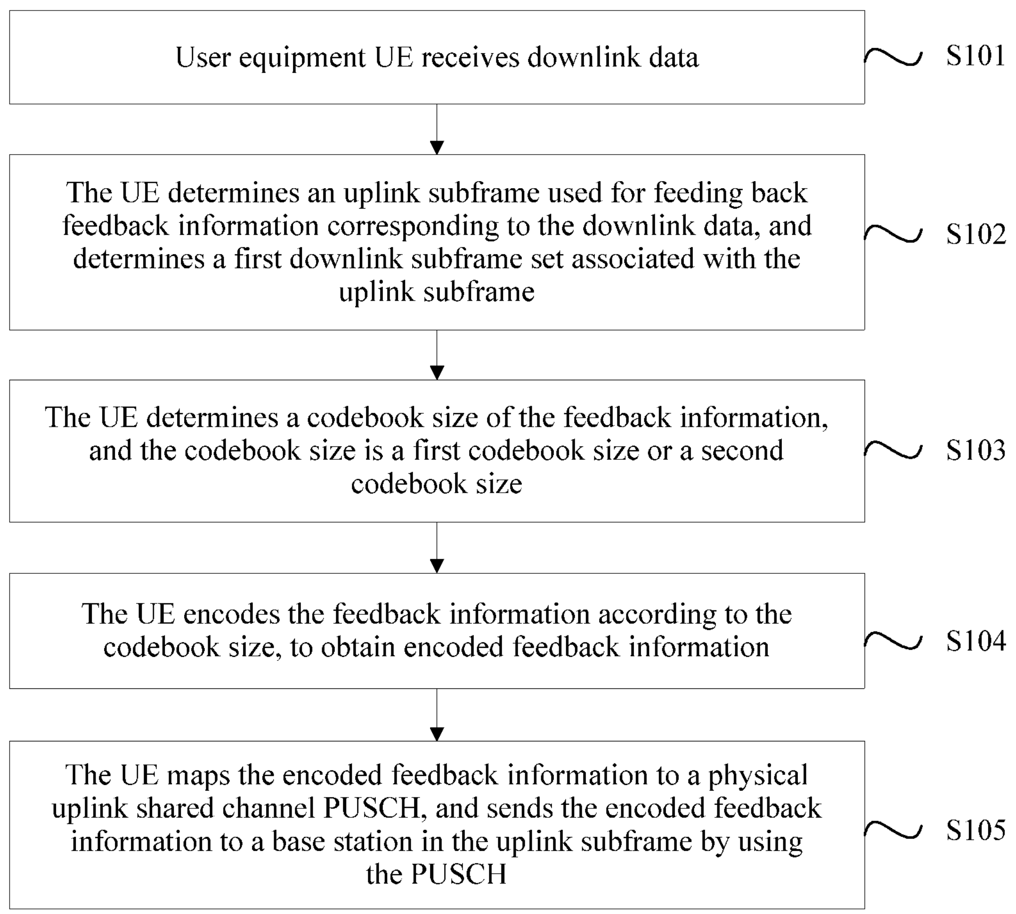
FIG. 1 is a schematic flowchart of Embodiment 1 of a feedback information transmission method in a communications system according to embodiments of the present disclosure.

To make the objectives, technical solutions, and advantages of the embodiments of the present disclosure clearer, the following describes the technical solutions in the embodiments of the present disclosure with reference to the accompanying drawings in the embodiments of the present disclosure. Apparently, the described embodiments are a part rather than all of the embodiments of the present disclosure. All other embodiments obtained by persons of ordinary skill in the art based on the embodiments of the present disclosure without creative efforts shall fall within the protection scope of the present disclosure.

In the embodiments of the present disclosure, when the UE further needs to send, in an uplink subframe in which the UE sends ACK/NACK information, uplink data, to maintain an uplink single-carrier characteristic of an LTE system, the UE maps the ACK/NACK information and the uplink data to a PUSCH, and sends both the ACK/NACK information and the uplink data to the base station. Optionally, the PUSCH may be scheduled using a downlink control channel. For example, a PUSCH in an uplink subframe 2 in an uplink-downlink subframe configuration 2 in a TDD system is scheduled using a downlink control channel sent in a downlink subframe 8 in a previous radio frame. Alternatively, the PUSCH may be a semi-persistently scheduled data channel, that is, the PUSCH does not need to be scheduled using a downlink control channel. The UE learns in advance that a semi-persistently scheduled uplink data channel needs to be sent in the uplink subframe 2.

The LTE system supports frequency division duplex (FDD) CA, time division duplex (TDD) CA, and FDD+TDD CA. The TDD CA includes TDD CA with a same uplink-downlink configuration and TDD CA with different uplink-downlink configurations. A PUCCH sending mode in a CA mode includes a channel selection mode and a PUCCH format 3. In the channel selection mode, an ACK/NACK feedback is performed using a PUCCH format 1a/1b, but CA of a maximum of two carriers is supported. In the PUCCH format 3 mode, a discrete Fourier transform-spread-orthogonal frequency division multiplexing (DFT-S-OFDM) sending structure is used, transmission of a maximum of about 20

ACK/NACK bits can be supported, and TDD CA of five carriers can be supported. In an example of a TDD uplink-downlink configuration 2, an uplink subframe 2 on one carrier can support a feedback of four ACK/NACK bits, and CA of five carriers with the TDD uplink-downlink configurations 2 can support 20 ACK/NACK bits, that is, if the UE further needs to send, in an uplink subframe in which the UE sends ACK/NACK information, uplink data, a current PUSCH can carry a maximum of about 20 ACK/NACK bits. Based on an existing CA mechanism, it is assumed that the base station configures N downlink subframes associated with an uplink subframe n for the UE, but only M downlink subframes in the N downlink subframes (where M<N, and M and N are positive integers) may be actually scheduled at a moment. In an existing method for calculating a codebook size of feedback information, the codebook size of the feedback information is usually determined based on N.

With further evolution of an LTE technology, in some scenarios, a PUSCH may need to carry ACK/NACK information of more bits, for example, more than 20 bits. Optionally, based on an existing CA architecture, when CA of more carriers such as CA of ten carriers is introduced, if CA is performed on ten carriers with the TDD uplink-downlink configuration 2, an ACK/NACK of 40 bits needs to be fed back. Optionally, when current CA of a maximum of five carriers continues to be supported, if multiple carriers are configured with a TDD uplink-downlink configuration 5, for example, if a primary component carrier is configured with the uplink-downlink configuration 2 and four secondary component carriers are configured with the uplink-downlink configuration 5, an ACK/NACK of 4+9×4=40 bits needs to be fed back. Optionally, when the PUSCH supports at least two TDD carriers with only a downlink subframe, or a combination of the foregoing carriers with different uplink-downlink configurations, the PUSCH may need to carry ACK/NACK information of more than 20 bits. Therefore, as CA is performed on more carriers, because M may be far less than N, relatively large overheads are caused when the codebook size of the feedback information is usually determined based on N. The codebook size is a quantity of original ACK/NACK bits or a quantity of ACK/NACK bits before encoding. That the codebook size is determined based on a quantity N of downlink subframes in a configured aggregation carrier set means that if one code word is scheduled in each downlink subframe, each downlink subframe is corresponding to an ACK/NACK feedback of one bit, and the codebook size is N; and if two code words are scheduled in each downlink subframe, each downlink subframe is corresponding to an ACK/NACK feedback of two bits, and the codebook size is 2×N.

FIG. 1 is a schematic flowchart of Embodiment 1 of a feedback information transmission method in a communications system according to embodiments of the present disclosure. As shown in FIG. 1, the method in this embodiment may include the following steps.

S101. User equipment (UE) receives downlink data.

An LTE system supports two duplex modes: FDD and TDD. In an FDD system, uplink transmission and downlink transmission are performed on different carries. In a TDD system, uplink transmission and downlink transmission are performed on a same carrier at different times. Specifically, a carrier includes a downlink subframe, an uplink subframe, and a special subframe. The special subframe includes three parts: a downlink pilot timeslot (DwPTS), a guard period (GP), and an uplink pilot timeslot (UpPTS). The GP is mainly used to compensate for a downlink-to-uplink device switching time and a downlink-to-uplink propagation delay. Downlink data can be transmitted in the DwPTS, but a PUSCH cannot be transmitted in the UpPTS. Table 1 shows different TDD uplink-downlink configurations in the LTE system, and LTE currently supports seven different TDD uplink-downlink configurations. As shown in Table 1, D represents a downlink subframe, S represents a special subframe, and U represents an uplink subframe.

TABLE 1

Different TDD uplink-downlink configurations in the LTE system

| Uplink-downlink configu-ration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In this embodiment of the present disclosure, the UE may receive, in a downlink subframe scheduled by the base station, the downlink data. The downlink subframe scheduled by the base station constitutes a second downlink subframe set, that is, a downlink subframe in the second downlink subframe set is a subframe actually scheduled by the base station. Optionally, before step S101, the method further includes: the UE receives downlink control information sent by the base station. For example, the UE receives, using a downlink control channel, the downlink control information sent by the base station. Correspondingly, step S101 includes: the UE receives, in the downlink subframe scheduled by the base station, the downlink data according to the downlink control information. For example, the UE receives, in the downlink subframe scheduled by the base station, the downlink data according to the downlink control information using a physical downlink shared channel (PDSCH). Optionally, the downlink control channel may be a physical downlink control channel (PDCCH) or an enhanced physical downlink control channel (EPDCCH). Optionally, the downlink control information may include scheduling information of a PDSCH or scheduling information of a PUSCH. The scheduling information may include control information such as channel resource allocation information and a modulation and coding scheme.

S102. The UE determines an uplink subframe used for feeding back feedback information corresponding to the downlink data, and determines a first downlink subframe set associated with the uplink subframe.

Generally, there is a pre-configured time sequence or timing relationship between a downlink subframe in which a PDSCH is scheduled and an uplink subframe used for feeding back feedback information corresponding to downlink data received in the downlink subframe. Optionally, (1) for FDD, after receiving, in a downlink subframe n−4, the downlink data using the PDSCH, the UE feeds back, in an uplink subframe n, ACK/NACK information; (2) for TDD, Table 2 shows a time sequence relationship of feeding back ACK/NACK information in the TDD system. A time sequence relationship between a downlink subframe in which downlink data is received using a PDSCH and an uplink subframe used for feeding back feedback information corresponding to the downlink data is shown in Table 2. A subframe corresponding to the subframe number n is the uplink subframe n used for feeding back the ACK/NACK information. For different uplink-downlink configurations, an identifier number corresponding to each subframe number n indicates that ACK/NACK information corresponding to downlink data in a downlink subframe set of n−k (k belongs to K) needs to be fed back in the uplink subframe n. For example, K={7, 6} corresponding to an uplink subframe n=2 in an uplink-downlink configuration 1 means that the uplink subframe 2 (n=2) is used to feed back ACK/NACK information corresponding to downlink data in two downlink subframes n−7 and n−6. Specifically, the downlink subframe n−7 is a downlink subframe 5, and the downlink subframe n−6 is a downlink subframe 6.

TABLE 2

Time sequence relationship between a PDSCH and an ACK/NACK corresponding to the PDSCH in the TDD system

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5 ,4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In this embodiment of the present disclosure, the UE determines, according to a preset time sequence relationship between a downlink subframe and an uplink subframe used for feeding back feedback information corresponding to downlink data received in the downlink subframe, the uplink subframe used for feeding back the feedback information corresponding to the downlink data, and the first downlink subframe set associated with the uplink subframe. Optionally, the feedback information is information used for determining whether the downlink data is correctly received, such as acknowledgment (ACK) information or negative acknowledgment (NACK) information. The first downlink subframe set includes all downlink subframes configured by the base station for the uplink subframe. For example, it is assumed that carriers 1 to 5 are configured for the UE, and each carrier has a TDD configuration 2, and then a first downlink subframe set associated with an uplink subframe 2 on a primary component carrier includes subframes 4, 5, 6, and 8 on the carriers 1 to 5, and includes 20 subframes in total. Because the base station does not schedule all downlink subframes in the first downlink subframe set at a moment, the second downlink subframe set is a subset of the first downlink subframe set. As CA is performed on more carriers, because the second downlink subframe set may be far smaller than the first downlink subframe set, relatively large overheads are caused when a codebook size of the feedback information is determined based on the first downlink subframe set. In this embodiment of the present disclosure, a dynamic fallback mechanism of a feedback information codebook is provided, the first downlink subframe set includes a first subset and a second subset, and the first subset is a proper subset of the second subset. Therefore, the codebook size of the feedback information is further determined according to a quantity of downlink subframes in the first subset or in the second subset, thereby reducing resource overheads. Optionally, the second subset may be equal to the first downlink subframe set. It should be noted that in this embodiment of the present disclosure, the first downlink subframe set includes but is not limited to only two subsets: the first subset and the second subset, or may include at least two subsets. For example, the first downlink subframe set may further include a third subset or a fourth subset.

Optionally, the UE may predetermine the first subset and the second subset, that is, the UE may determine the first subset and the second subset according to a pre-configured rule.

TDD CA is described as an example in this embodiment of the present disclosure. If the base station configures 15 carriers for the UE, and the 15 carriers are corresponding to a same TDD uplink-downlink configuration 2, it is determined, according to the time sequence relationship in Table 2, that ACK/NACK information corresponding to data channels in downlink subframes 4, 5, 6, and 8 on a maximum of the 15 carriers needs to be fed back in an uplink subframe 2 on a primary component carrier. All the downlink subframes (that is, the downlink subframes 4, 5, 6, and 8 on the carriers 1 to 15) constitute a first downlink subframe set (optionally, in the prior art, it is determined, based on a quantity of downlink subframes in the first downlink subframe set, that the codebook size of the feedback information is 4×15=60 bits). Optionally, data channels on the 15 carriers may be separately scheduled using independent control channels; or data channels in multiple subframes and/or on multiple carriers may be scheduled using one control channel. A manner of scheduling the data channels on the 15 carriers is not limited in this embodiment of the present disclosure. Independent scheduling is described as an example in this embodiment. In addition, this embodiment of the present disclosure may be further used in TDD CA in which multiple different uplink-downlink configurations are configured for UE, TDD+FDD CA, and the like.

In this embodiment, the first downlink subframe set includes the first subset and the second subset. The first subset is a proper subset of the second subset, that is, the second subset includes the first subset and the quantity of downlink subframes in the second subset is greater than the quantity of downlink subframes in the first subset. In this embodiment of the present disclosure, it is assumed that downlink subframes with a same subframe number on different carriers are different downlink subframes. Because downlink data can be transmitted in a special subframe but uplink data cannot be transmitted in the special subframe, a TDD special subframe may also be referred to as a downlink subframe. For example, the first subset includes downlink subframes 4, 5, 6, and 8 on carriers 1 to 5, and the second subset includes downlink subframes 4, 5, 6, and 8 on carriers 1 to 10. It can be learned that the second subset includes the first subset. Optionally, there is a third subset in this embodiment. It is assumed that the third subset includes downlink subframes 4, 5, 6, and 8 on carriers 1 to 15, that is, the third subset includes all pre-configured downlink subframes that are associated with ACK/NACK information fed back in an uplink subframe and that are configured by the base station for the UE. That is, the third subset is equal to the first downlink subframe set. It can be learned that a relationship between the first subset and the second subset, a relationship between the second subset and the third subset, and a relationship between the first subset and the third subset are structurally similar. Optionally, the first subset may partially overlap with the second subset. Certainly, another manner may be used in this embodiment of the present disclosure, and details are not described herein again.

In this embodiment of the present disclosure, a manner in which the first subset and the second subset are determined according to the pre-configured rule is specifically as follows: The first subset and the second subset are determined according to a carrier number and/or a subframe number and with reference to an ACK/NACK bit quantity threshold (such as 20 bits, 21 bits, or 22 bits). (1) For example, the UE determines that the first subset includes downlink subframes 4, 5, 6, and 8 on carriers 1 to 5, and the second subset includes downlink subframes 4, 5, 6, and 8 on carriers 1 to 10. In a method for selecting the first subset, all downlink subframes on the carrier 1 are first selected according to a sequence of time-domain subframe numbers, and then downlink subframes on the carrier 2 are selected based on a frequency-domain carrier number, until a quantity of downlink subframes reaches the bit quantity threshold. A manner of selecting the second subset is similar to the manner of selecting the first subset. (2) For example, it is assumed that the foregoing bit quantity threshold is 10, there are five carriers, and each carrier has an uplink-downlink configuration 2. In a first set division manner, the first subset includes downlink subframes 4, 5, 6, and 8 on carriers 1 and 2 and downlink subframes 4 and 5 on a carrier 3, and in addition to all downlink subframes in the first subset, the second subset includes downlink subframes 6 and 8 on the carrier 3 and downlink subframes 4, 5, 6, and 8 on carriers 3 and 4. In this case, different subframes on one carrier are grouped into different downlink subframe sets. It can be learned that in this example, the first subset and the second subset are still first selected according to a time-domain subframe number and then are selected according to a frequency-domain carrier number. In a second set division manner, the first subset includes downlink subframes 4, 5, 6, and 8 on carriers 1 and 2, and in addition to all downlink subframes in the first subset, the second subset includes downlink subframes 4, 5, 6, and 8 on carriers 3 to 5. In this example, a division rule is: it is determined, according to a carrier number, a subframe number, and a bit quantity threshold, that downlink subframes on carriers of a maximum quantity that does not exceed the bit quantity threshold are a set. Different subframes on a same carrier cannot be grouped into multiple sets that are not completely intersected. If different subframes on a same carrier are grouped into multiple sets that are not completely intersected, a quantity of downlink subframes in a set is less than the foregoing bit quantity threshold. Optionally, with reference to a bit quantity threshold, the first subset and the second subset may be first selected according to a frequency-domain carrier number and then may be selected according to a time-domain subframe number.

Optionally, the UE may determine the first subset and the second subset according to indication signaling sent by the base station. For example, the base station notifies the UE of a division rule using the indication signaling. Optionally, the UE directly receives the first subset and the second subset that are determined by the base station. For example, the base station directly notifies the UE of the first subset and the second subset that are obtained by means of division. Certainly, the UE may determine the first subset and the second subset in another manner, and this is not limited in this embodiment of the present disclosure.

S103. The UE determines a codebook size of the feedback information, and the codebook size is a first codebook size or a second codebook size.

In this embodiment of the present disclosure, according to codebook size indication information sent by the base station to the UE after the base station determines the codebook size of the feedback information, or according to a relationship between the second downlink subframe set, the first subset, and the second subset, the UE may determine that the codebook size of the feedback information is the first codebook size or the second codebook size. The first codebook size is corresponding to the quantity of downlink subframes included in the first subset (that is, the first codebook size is determined according to the quantity of downlink subframes included in the first subset). The second codebook size is corresponding to the quantity of downlink subframes included in the second subset (that is, the second codebook size is determined according to the quantity of downlink subframes included in the second subset). That is, the UE may determine the codebook size of the feedback information according to a status of a downlink subframe actually scheduled by the base station. Therefore, the determined codebook size of the feedback information is less than or equal to a codebook size determined by the UE according to the quantity of downlink subframes in the first downlink subframe set in the prior art. In this way, a PUSCH can carry ACK/NACK information of more bits, and performance of an ACK/NACK and performance of uplink data in the PUSCH are improved when a predetermined quantity of resources are used, or resource overheads are reduced when it is ensured that performance of an ACK/NACK is the same as performance of uplink data in the PUSCH.

Optionally, in a manner in which the UE determines the codebook size of the feedback information according to the codebook size indication information sent by the base station, the codebook size indication information may be first indication information, second indication information, or a combination of the first indication information and the second indication information. A specific process is as follows.

Optionally, that the UE determines a codebook size of the feedback information includes: if the UE receives first indication information sent by the base station, and the first indication information indicates the first codebook size, the UE determines that the codebook size of the feedback information is the first codebook size; or if the UE receives first indication information sent by the base station, and the first indication information indicates the second codebook size, the UE determines that the codebook size of the feedback information is the second codebook size; or if the UE does not receive first indication information, the UE determines that the codebook size of the feedback information is the first codebook size.

In this embodiment of the present disclosure, in a first possible implementation manner, after determining that the codebook size of the feedback information is the first codebook size, the base station notifies the UE of the first indication information including the first codebook size (that is, the codebook size indication information), and if the UE receives the first indication information sent by the base station (the first indication information indicates that the codebook size that is of the feedback information and that is determined by the base station is the first codebook size), the UE directly determines that the codebook size of the feedback information is the first codebook size. In a second possible implementation manner, after determining that the codebook size of the feedback information is the second codebook size, the base station notifies the UE of the first indication information including the second codebook size (that is, the codebook size indication information), and if the UE receives the first indication information sent by the base station (the first indication information indicates that the codebook size that is of the feedback information and that is determined by the base station is the second codebook size), the UE directly determines that the codebook size of the feedback information is the second codebook size. In a third possible implementation manner, if the UE does not receive the first indication information, the UE determines that the codebook size of the feedback information is the first codebook size.

Optionally, the first indication information is information in the downlink control information. For example, the first indication information is information in downlink control information used for scheduling a downlink subframe in the second downlink subframe set (or the first indication information may be carried on a control channel used by the base station to schedule a downlink subframe in the second downlink subframe set). Optionally, the first indication information may indicate a codebook size using a two-bit field in a secondary PDCCH used for scheduling a PDSCH on a secondary component carrier, or may indicate a codebook size using a two-bit field in a primary PDCCH used for scheduling a PDSCH on a primary component carrier, and a value of a downlink assignment index (DAI) field in the primary PDCCH is greater than 1. Optionally, parsing information of each state of a corresponding bit field used for indicating the first indication information is pre-configured for the UE, so that when receiving the first indication information sent by the base station, the UE determines, according to the corresponding bit field and the pre-configured parsing information, the codebook size that is of the feedback information and that is indicated by the base station. For example, parsing information of four states of the two-bit field in the secondary PDCCH and parsing information of four states of the two-bit field in the primary PDCCH with the DAI field value greater than 1 are pre-configured for the UE. For example, the UE obtains the parsing information of the four states of the two bits using higher layer radio resource control (RRC) signaling. For example, {00, 01, 10, n} are respectively parsed into {first codebook size, first codebook size, second codebook size, second codebook size}. Based on the pre-configured information, if the UE receives the secondary PDCCH, and a state of the two bits is 01, the UE determines, according to the first indication information, that the codebook size of the feedback information is the first codebook size. Optionally, if the first downlink subframe set further includes a third subset, a fourth subset, and a fifth subset, correspondingly, a third codebook size, a fourth codebook size, and a fifth codebook size are further included. In this case, the two bits cannot indicate all the five codebook sizes. Optionally, the first indication information may indicate a codebook size using a three-bit field in a secondary PDCCH used for scheduling a PDSCH on a secondary component carrier, or may indicate a codebook size using a three-bit field in a primary PDCCH used for scheduling a PDSCH on a primary component carrier, and a value of a DAI field in the primary PDCCH is greater than 1. Certainly, in this embodiment of the present disclosure, the first indication information may be represented in another manner, and details are not described herein again.

In this embodiment of the present disclosure, the UE may not receive the first indication information in some cases. For example, for the FDD system, the UE receives only a primary PDCCH that is sent by the base station and that is used for scheduling a PDSCH on a primary component carrier (that is, the primary PDCCH does not include the first indication information); or for the TDD system, the UE receives only a primary PDCCH that is sent by the base station and that is used for scheduling a PDSCH on a primary component carrier, and DAI=1 in the primary PDCCH (that is, the primary PDCCH does not include the first indication information). Alternatively, the UE misses detecting a control channel, so that if the UE receives only the control channel that does not include the first indication information, the UE cannot determine the codebook size of the feedback information according to the first indication information. If it is determined that the codebook size of the feedback information is the second codebook size, the UE and the base station have a consistent understanding only when the UE really misses detecting all control channels used for scheduling a downlink subframe beyond the first subset; however, a probability of such case is relatively low. In addition, a risk of selecting the first codebook size is that the UE and the base station have inconsistent understandings of the codebook size only when the UE misses detecting all the control channels used for scheduling the downlink subframe beyond the first subset; however, obviously, a probability of such case is extremely low. Therefore, because a probability that the UE misses detecting a larger quantity of control channels is much lower than a probability that the UE misses detecting a smaller quantity of control channels, the UE determines that the codebook size of the feedback information is the first codebook size. That is, some PDCCHs actually received by the UE include the first indication information, but some PDCCHs actually received by the UE do not include the first indication information. Once the UE receives only a PDCCH that does not include the first indication information, the UE determines that the codebook size of the feedback information is the first codebook size. Correspondingly, to ensure that the base station and the UE have a consistent understanding of the codebook size of the feedback information, if the base station sends, to the UE, only the primary PDCCH used for scheduling the PDSCH on the primary component carrier, or only the primary PDCCH used for scheduling the PDSCH on the primary component carrier (DAI=1 in the primary PDCCH), optionally, the base station determines that the codebook size of the feedback information is the first codebook size, and receives, according to the first codebook size, encoded ACK/NACK information fed back by the UE.

Optionally, that the UE determines a codebook size of the feedback information includes: if the UE receives second indication information sent by the base station, and the second indication information indicates the first codebook size, the UE determines that the codebook size of the feedback information is the first codebook size; or if the UE receives second indication information sent by the base station, and the second indication information indicates the second codebook size, the UE determines that the codebook size of the feedback information is the second codebook size; or if the UE does not receive second indication information, the UE determines that the codebook size of the feedback information is a predefined codebook size, and the predefined codebook size is the first codebook size or the second codebook size.

In this embodiment of the present disclosure, in a first possible implementation manner, after determining that the codebook size of the feedback information is the first codebook size, the base station notifies the UE of the second indication information including the first codebook size (that is, the codebook size indication information), and if the UE receives the second indication information sent by the base station (the second indication information indicates that the codebook size that is of the feedback information and that is determined by the base station is the first codebook size), the UE directly determines that the codebook size of the feedback information is the first codebook size. In a second possible implementation manner, after determining that the codebook size of the feedback information is the second codebook size, the base station notifies the UE of the second indication information including the second codebook size (that is, the codebook size indication information), and if the UE receives the second indication information sent by the base station (the second indication information indicates that the codebook size that is of the feedback information and that is determined by the base station is the second codebook size), the UE directly determines that the codebook size of the feedback information is the second codebook size. In a third implementation manner, if the UE does not receive the second indication information, the UE determines that the codebook size of the feedback information is the predefined codebook size, and the predefined codebook size is the first codebook size or the second codebook size.

Optionally, the second indication information is information in uplink scheduling information used for scheduling the PUSCH. For example, the second indication information is indication information in a control channel (that is an uplink scheduling grant) for scheduling a PUSCH that is currently used to carry an ACK/NACK and uplink data (or the second indication information is carried in a control channel used by the base station to schedule the PUSCH). Optionally, the second indication information may indicate a codebook size using an indicator field of a downlink assignment indicator (UL_DAI) in the uplink scheduling grant, an indicator field of an uplink scheduling index (UL_index) in the uplink scheduling grant, or a newly-added bit. For example, the second indication information may indicate, using one newly-added bit or one bit in current two bits of the UL_DAI, that the codebook size of the feedback information is the first codebook size or the second codebook size, or may indicate codebook sizes of more levels using at least two bits. Optionally, parsing information of each state of a corresponding bit field used for indicating the second indication information is pre-configured for the UE, so that when receiving the second indication information sent by the base station, the UE determines, according to the corresponding bit field and the pre-configured parsing information, the codebook size that is of the feedback information and that is indicated by the base station. For example, when the second indication information is represented using one bit, two states of the one bit are separately {0, 1}, and corresponding parsing information is separately {first codebook size, second codebook size}. Based on the pre-configured information, if the UE receives the uplink scheduling information (that is, the second indication information), and a state of the one bit is 0 (that is, the second indication information indicates the first codebook size), the UE determines, according to the second indication information, that the codebook size of the feedback information is the first codebook size. Certainly, in this embodiment of the present disclosure, the second indication information may be represented in another manner, and details are not described herein again.

In this embodiment of the present disclosure, when the UE may not receive the second indication information in some cases, for example, when no uplink scheduling grant is sent in a semi-persistent PUSCH scheduling scenario, the UE may determine that the codebook size of the feedback information is the predefined codebook size, and the predefined codebook size is the first codebook size or the second codebook size. Correspondingly, to ensure that the base station and the UE have a consistent understanding of the codebook size of the feedback information, the base station also determines that the codebook size of the feedback information is the predefined codebook size (optionally, it is pre-configured that which codebook size is determined as the codebook size of the feedback information in this scenario).

Optionally, that the UE determines a codebook size of the feedback information includes: if the UE receives first indication information and second indication information that are sent by the base station, and the first indication information and the second indication information indicate the first codebook size, the UE determines that the codebook size of the feedback information is the first codebook size; or if the UE receives first indication information and second indication information that are sent by the base station, and the first indication information and the second indication information indicate the second codebook size, the UE determines that the codebook size of the feedback information is the second codebook size; or if the UE does not receive first indication information, the UE determines that the codebook size of the feedback information is the first codebook size; or if the UE does not receive first indication information but receives second indication information, the UE determines that the codebook size of the feedback information is the first codebook size or the second codebook size indicated by the second indication information; or if the UE neither receives first indication information nor receives second indication information, the UE determines that the codebook size of the feedback information is the first codebook size.

In this embodiment of the present disclosure, the base station may indicate the codebook size of the feedback information using both the first indication information and the second indication information. Optionally, the first indication information is information in the downlink control information. For example, the first indication information is information in downlink control information used for scheduling a downlink subframe in the second downlink subframe set. For a specific indication manner of the first indication information, refer to a part about an indication manner of the first indication information in descriptions of determining the codebook size of the feedback information by the UE according to the first indication information. Details are not described herein again. Optionally, the second indication information is information in uplink scheduling information used for scheduling the PUSCH. For example, the second indication information is indication information in a control channel (that is, an uplink scheduling grant) for scheduling a PUSCH that is currently used to carry an ACK/NACK and uplink data. Optionally, the second indication information may indicate a codebook size using an indicator field of a UL_DAI, an indicator field of a UL_index, or a newly-added bit. For example, the second indication information may indicate the codebook size of the feedback information using one newly-added bit or one bit in current two bits of the UL_DAI, or may indicate codebook sizes of more levels using at least two bits. Optionally, parsing information of each state of a corresponding bit field used for indicating the first indication information and the second indication information is pre-configured for the UE, so that when receiving the first indication information and/or the second indication information sent by the base station, the UE determines, according to the corresponding bit field and the pre-configured parsing information, the codebook size that is of the feedback information and that is indicated by the base station.

In this embodiment of the present disclosure, it is assumed that the first indication information is represented using two bits, four bit states of the first indication information are {00, 01, 10, 11}, and corresponding parsing information is separately {first codebook size, first codebook size, second codebook size, second codebook size}. It is assumed that the second indication information is represented using one bit, two states of the one bit are separately {0, 1}, and corresponding parsing information is separately {first codebook size, second codebook size}. (1) When the UE receives the first indication information and the second indication information, and a state of the two bits is {00} and a state of the one bit is {o}, the UE directly determines, based on the pre-configured information, that the codebook size of the feedback information is the first codebook size. (2) When the UE receives the first indication information and the second indication information, and a state of the two bits is {10} and a state of the one bit is {1}, the UE directly determines that the codebook size of the feedback information is the second codebook size. (3) When the UE does not receive the first indication information, the UE may directly determine that the codebook size of the feedback information is the first codebook size. (4) When the UE does not receive the first indication information but receives the second indication information, the UE determines that the codebook size of the feedback information is the first codebook size or the second codebook size indicated by the second indication information. For example, if a state of the one bit is {1}, the UE directly determines that the codebook size of the feedback information is the second codebook size. (5) When the UE does not receive the first indication information or the second indication information, the UE directly determines that the codebook size of the feedback information is the first codebook size; and correspondingly, if the base station does not send the first indication information or the second indication information to the UE, the base station receives, according to the first codebook size, encoded ACK/NACK information fed back by the UE.

Optionally, the two bit states of the one bit may be further divided based on the first codebook size or the second codebook size indicated by the first indication information (optionally, the second indication information may further indicate a third codebook size). If a bit state of the first indication information is 10, the second codebook size is indicated (that is, the first indication information indicates the second codebook size) (specifically, the second codebook size is corresponding to the second subset). (1) In this case, if a bit state of the second indication information is 0, according to the second codebook size indicated by the first indication information, it indicates that an ACK/NACK is encoded according to the second codebook size corresponding to the second subset, and the UE determines that the codebook size of the feedback information is the second codebook size. (2) In this case, if a bit state of the second indication information is 1, it may indicate that the determined codebook size of the feedback information is a third codebook size that is less than the second codebook size but is greater than the first codebook size. The third codebook size is determined according to a quantity of downlink subframes included in a third subset. The third subset may be a subset of the second subset, and the quantity of downlink subframes included in the third subset is greater than the quantity of downlink subframes included in the first subset. A downlink subframe included in the third subset is different from that in the first subset. Optionally, the third subset may include the first subset, or may partially overlap with the first subset, or even does not overlap with the first subset.

Optionally, the second indication information may further indicate a fourth codebook size, and details are as follows. The UE may not receive the first indication information in some cases, and the codebook size of the feedback information may be determined according to two solutions in this case. (1) Solution 1: The UE directly determines that the codebook size of the feedback information is the first codebook size, so that an ACK/NACK is encoded according to the first codebook size corresponding to the first subset, and correspondingly, the base station receives encoded ACK/NACK information according to the first codebook size. (2) Solution 2: If the UE receives the second indication information, the UE determines, according to the second indication information, that the codebook size of the feedback information is the first codebook size or the second codebook size. Optionally, the second indication information may indicate a codebook size using an indicator field of a UL_DAI, an indicator field of a UL_index, or a newly-added bit. For example, the second indication information may indicate the codebook size of the feedback information using one newly-added bit or one bit in current two bits of the UL_DAI, or may indicate codebook sizes of more levels using at least two bits. Optionally, parsing information of each state of a corresponding bit field used for indicating the second indication information is pre-configured for the UE, so that when the UE does not receive the first indication information but receives the second indication information sent by the base station, the UE determines the codebook size of the feedback information according to the corresponding bit field and the pre-configured parsing information. For example, when the second indication information is represented using one bit, two states of the one bit are separately {0, 1}, and corresponding parsing information is separately {first codebook size, fourth codebook size}. Based on the pre-configured information, when the UE receives the uplink scheduling information (that is, the second indication information), if a state of the one bit is 0, the UE determines, according to the second indication information, that the codebook size of the feedback information is the first codebook size; or if a state of the one bit is 1, the UE determines, according to the second indication information, that the codebook size of the feedback information is the fourth codebook size. The fourth codebook size is less than the first codebook size, the fourth codebook size is determined according to a quantity of downlink subframes included in a fourth subset, and the fourth subset may be a subset of the first subset.

Optionally, a process in which the UE determines the codebook size of the feedback information according to the relationship between the second downlink subframe set, the first subset, and the second subset is as follows.

Optionally, step S101 includes: the UE receives, in a downlink subframe scheduled by the base station, the downlink data. The downlink subframe scheduled by the base station constitutes a second downlink subframe set, and the second downlink subframe set is a subset of the first downlink subframe set.

That the UE determines a codebook size of the feedback information includes: if the second downlink subframe set is a subset of the first subset, the UE determines that the codebook size of the feedback information is the first codebook size; or if the second downlink subframe set includes only a downlink subframe that is in the second subset and that does not belong to the first subset, the UE determines that the codebook size of the feedback information is the first codebook size or the second codebook size; or if the second downlink subframe set includes a downlink subframe in the first subset and a downlink subframe that is in the second subset and that does not belong to the first subset, and the second downlink subframe set does not include a downlink subframe beyond the first subset and the second subset, the UE determines that the codebook size of the feedback information is the second codebook size.

S104. The UE encodes the feedback information according to the codebook size, to obtain encoded feedback information.

In this embodiment of the present disclosure, the UE performs RM encoding or convolutional encoding on the feedback information according to the codebook size determined in step S103, such as the first codebook size or the second codebook size, to obtain the encoded feedback information. Optionally, another encoding manner may be used in this embodiment of the present disclosure, and details are not described herein again. Optionally, ACKs/NACKs in a codebook are ranked according to a carrier number and a subframe number, and zero filling is performed at a location of an ACK/NACK corresponding to a downlink subframe that is in the first subset or the second subset but that is not scheduled.

S105. The UE maps the encoded feedback information to a physical uplink shared channel (PUSCH), and sends the encoded feedback information to the base station in the uplink subframe using the PUSCH.

In this embodiment of the present disclosure, the UE generates a PUSCH used for sending, in the uplink subframe, uplink data, performs rate matching and symbol modulation on the encoded feedback information, maps the encoded feedback information to the physical uplink shared channel (PUSCH), and sends both the uplink data that needs to be sent and the encoded feedback information to the base station in the uplink subframe using the PUSCH. In this way, an uplink single-carrier characteristic of the LTE system is maintained and efficiency of uplink transmit power is improved.

In this embodiment of the present disclosure, user equipment (UE) receives downlink data, and the UE determines an uplink subframe used for feeding back feedback information corresponding to the downlink data, and determines a first downlink subframe set associated with the uplink subframe. The first downlink subframe set includes a first subset and a second subset, and the first subset is a proper subset of the second subset. Further, the UE determines a codebook size of the feedback information. The codebook size is a first codebook size or a second codebook size, the first codebook size is corresponding to a quantity of downlink subframes included in the first subset, and the second codebook size is corresponding to a quantity of downlink subframes included in the second subset. Further, the UE encodes the feedback information according to the codebook size, to obtain encoded feedback information, and then the UE maps the encoded feedback information to a physical uplink shared channel (PUSCH), and sends the encoded feedback information to the base station in the uplink subframe using the PUSCH. That is, the UE may determine the codebook size of the feedback information according to a status of a downlink subframe actually scheduled by the base station. In this way, a PUSCH can carry ACK/NACK information of more bits, and performance of an ACK/NACK and performance of uplink data in the PUSCH are improved when a predetermined quantity of resources are used, or resource overheads are reduced when it is ensured that performance of an ACK/NACK is the same as performance of uplink data in the PUSCH.

Further, the following describes how to resolve a problem that the UE and the base station have inconsistent understandings of the codebook size of the feedback information because the UE may miss detecting a control channel. If the base station schedules a downlink subframe in the first subset, and further schedules a downlink subframe that is in the second subset and that does not belong to the first subset, the base station expects that the UE encodes an ACK/NACK using the second codebook size. However, if the UE receives only a control channel used for scheduling a downlink subframe in the first subset because the UE misses detecting the control channel, the UE encodes the ACK/NACK using the first codebook size. Consequently, the UE and the base station have inconsistent understandings, and finally, the ACK/NACK may be wrongly decoded. In this embodiment of the present disclosure, the encoded feedback information is scrambled using different scrambling codes, so that the base station can learn, by performing descrambling processing using different scrambling codes, the codebook size that is of the feedback information and that is used when the UE encodes the feedback information. In this way, the problem that the base station and the UE have inconsistent understandings of the codebook size of the feedback information is avoided.

Optionally, before the UE maps the encoded feedback information to the PUSCH, the method further includes: if the codebook size is the first codebook size, the UE scrambles the encoded feedback information using a first scrambling code; or if the codebook size is the second codebook size, the UE scrambles the encoded feedback information using a second scrambling code.

In this embodiment of the present disclosure, if the determined codebook size of the feedback information is the first codebook size, the UE scrambles the encoded feedback information using the first scrambling code; or if the determined codebook size of the feedback information is the second codebook size, the UE scrambles the encoded feedback information using the second scrambling code, so that the base station can learn, by performing descrambling processing using different scrambling codes, the codebook size that is of the feedback information and that is determined by the UE. In this way, the UE maintains a consistent understanding of the codebook size with the base station.

Optionally, if the codebook size is the first codebook size, that the UE encodes the feedback information according to the codebook size, to obtain encoded feedback information includes: the UE encodes the feedback information according to the first codebook size, to obtain first encoded feedback information; and that the UE maps the encoded feedback information to a PUSCH includes: the UE determines a first proportion factor configured by the base station, and determines a first quantity of symbols according to the first proportion factor, and the first quantity of symbols is a quantity of symbols that need to be occupied to map the first encoded feedback information to the PUSCH; and the UE maps the first encoded feedback information to the PUSCH according to the first quantity of symbols.

Alternatively, if the codebook size is the second codebook size, that the UE encodes the feedback information according to the codebook size, to obtain encoded feedback information includes: the UE encodes the feedback information according to the second codebook size, to obtain second encoded feedback information; and that the UE maps the encoded feedback information to a PUSCH includes: the UE determines a second proportion factor configured by the base station, and determines a second quantity of symbols according to the second proportion factor, and the second quantity of symbols is a quantity of symbols that need to be occupied to map the second encoded feedback information to the PUSCH; and the UE maps the second encoded feedback information to the PUSCH according to the second quantity of symbols.

In this embodiment of the present disclosure, because the first codebook size is corresponding to the first subset and the second codebook size is corresponding to the second subset, the first codebook size and the second codebook size represent different quantities of original ACK/NACK bits. The second codebook size is greater than the first codebook size. Therefore, when ACK/NACK information that occupies a quantity of modulation symbols is mapped to the PUSCH based on the first codebook size or the second codebook size, correspondingly, the first proportion factor or the second proportion factor is independently configured, so that performance of an ACK/NACK encoded based on the first codebook size is consistent with performance of an ACK/NACK encoded based on the second codebook size. (1) If the codebook size is the first codebook size, the UE encodes the feedback information according to the first codebook size, to obtain the first encoded feedback information; further, the UE determines the first proportion factor configured by the base station, and determines, according to the first proportion factor, the first quantity of symbols that need to be occupied to map the first encoded feedback information to the PUSCH; and further, the UE maps the first encoded feedback information to the PUSCH according to the first quantity of symbols. (2) If the codebook size is the second codebook size, the UE encodes the feedback information according to the second codebook size, to obtain the second encoded feedback information; further, the UE determines the second proportion factor configured by the base station, and determines, according to the second proportion factor, the second quantity of symbols that need to be occupied to map the second encoded feedback information to the PUSCH; and further, the UE maps the second encoded feedback information to the PUSCH according to the second quantity of symbols.

The first proportion factor and the second proportion factor each represent a ratio of an encoding rate of uplink data to an encoding rate of an ACK/NACK in the PUSCH, and the ratio may be specifically obtained using the following formula:

$$Q' = \min\left(\left\lceil \frac{O \cdot M^{PUSCH-initial} \cdot N^{PUSCH-initial} \cdot \beta^{PUSCH}}{\sum_{r=0}^{C-1} K_r} \right\rceil, 4 \cdot M^{PUSCH}\right)$$

$M^{PUSCH\text{-}initial}$ represents a quantity of frequency-domain subcarriers occupied by a scheduled PUSCH when current uplink data is initially scheduled, $M^{PUSCH}$ represents a quantity of frequency-domain subcarriers occupied by the scheduled PUSCH when the current uplink data is scheduled in a current subframe, and $N^{PUSCH\text{-}initial}$ represents a quantity of time-domain symbols occupied by the scheduled PUSCH when the current uplink data is initially scheduled. Kr is a quantity of original bits of uplink data before encoding, C is a quantity of code blocks of the uplink data, O is a codebook size of an ACK/NACK, and Q' is a quantity of modulation symbols occupied by an encoded ACK/NACK in the PUSCH. A product of 4 and M represents that the ACK/NACK occupies modulation symbols on a maximum of four OFDM symbols in the PUSCH, and a product of M and N represents a quantity of modulation symbols scheduled for the uplink data. $\beta^{PUSCH}$ represents the ratio of the encoding rate of the uplink data to the encoding rate of the ACK/NACK in the PUSCH, that is, the first proportion factor or the second proportion factor.

Figure 2:
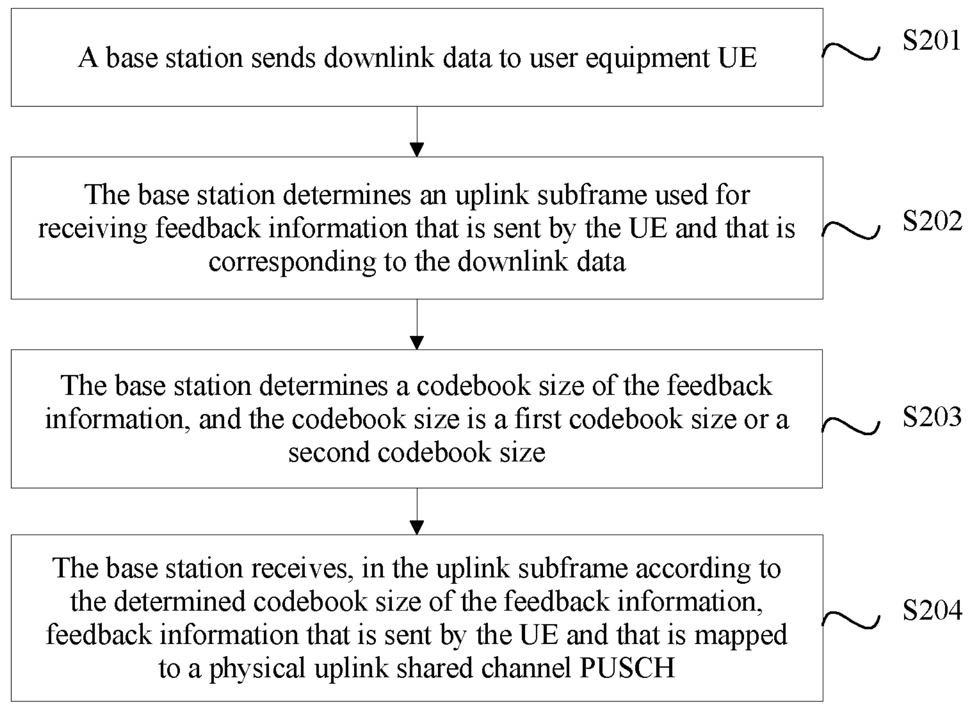
FIG. 2 is a schematic flowchart of Embodiment 2 of a feedback information transmission method in a communications system according to embodiments of the present disclosure.

FIG. 2 is a schematic flowchart of Embodiment 2 of a feedback information transmission method in a communications system according to the present disclosure. Based on Embodiment 1 of the foregoing feedback information transmission method in the communications system, this embodiment is described in detail on a base station side. As shown in FIG. 2, the method in this embodiment may include the following steps.

S201. A base station sends downlink data to user equipment (UE).

In this embodiment of the present disclosure, the base station may send the downlink data to the UE in a downlink subframe scheduled by the base station. The downlink subframe scheduled by the base station constitutes a second downlink subframe set, that is, a downlink subframe in the second downlink subframe set is a subframe actually scheduled by the base station. Optionally, before step S201, the method further includes: the base station sends downlink control information to the UE. For example, the base station sends the downlink control information to the UE using a downlink control channel, and sends, using a PDSCH, the downlink data to the UE in the downlink subframe scheduled by the base station. Optionally, the downlink control channel may be a PDCCH or an EPDCCH.

S202. The base station determines an uplink subframe used for receiving feedback information that is sent by the UE and that is corresponding to the downlink data.

In this embodiment of the present disclosure, the base station determines, according to a preset time sequence relationship between the downlink subframe and the uplink subframe used by the UE to feed back the feedback information corresponding to the downlink data received in the downlink subframe, the uplink subframe used for receiving the feedback information that is sent by the UE and that is corresponding to the downlink data. Optionally, the feedback information is information used for determining whether the downlink data is correctly received, such as acknowledgment (ACK) information or negative acknowledgment (NACK) information. All pre-configured downlink subframes associated with the uplink subframe constitute a first downlink subframe set (that is, the first downlink subframe set includes all downlink subframes configured by the base station for the uplink subframe). For example, it is assumed that carriers 1 to 5 are configured for the UE, and each carrier has a TDD configuration 2, and then a first downlink subframe set associated with an uplink subframe 2 on a primary component carrier includes subframes 4, 5, 6, and 8 on the carriers 1 to 5, and includes 20 subframes in total. Because the base station does not schedule all downlink subframes in the first downlink subframe set at a moment, the second downlink subframe set is a subset of the first downlink subframe set. As CA is performed on more carriers, because the second downlink subframe set may be far smaller than the first downlink subframe set, relatively large overheads are caused when a codebook size of the feedback information is determined based on the first downlink subframe set. In this embodiment of the present disclosure, a dynamic fallback mechanism of a feedback information codebook is provided, the first downlink subframe set includes a first subset and a second subset, and the first subset is a proper subset of the second subset. Therefore, the codebook size of the feedback information is further determined according to a quantity of downlink subframes in the first subset or in the second subset, thereby reducing resource overheads. Optionally, the second subset may be equal to the first downlink subframe set. It should be noted that in this embodiment of the present disclosure, the first downlink subframe set includes but is not limited to only two subsets: the first subset and the second subset, or may include at least two subsets. For example, the first downlink subframe set may further include a third subset or a fourth subset.

Optionally, in this embodiment of the present disclosure, the base station may send division rule indication signaling to the UE, so that the UE determines the first subset and the second subset according to the division rule indication signaling; or the base station may directly send the determined first subset and the determined second subset to the UE.

S203. The base station determines a codebook size of the feedback information, and the codebook size is a first codebook size or a second codebook size.

In this embodiment of the present disclosure, the base station determines the codebook size of the feedback information according to a status of an actually scheduled downlink subframe. That is, the base station determines the codebook size of the feedback information according to the first subset or the second subset in the second downlink subframe set. For example, a codebook size that is of the feedback information and that is determined according to the quantity of downlink subframes included in the first subset is the first codebook size, and a codebook size that is of the feedback information and that is determined according to the quantity of downlink subframes included in the second subset is the second codebook size. It can be learned that the determined codebook size of the feedback information is less than or equal to a codebook size determined by the UE according to a quantity of downlink subframes in the first downlink subframe set in the prior art.

Further, after determining the codebook size of the feedback information, the base station notifies the UE of the determined codebook size of the feedback information using codebook size indication information, so that the UE determines the codebook size of the feedback information according to the codebook size indication information. In this way, the UE and the base station have a consistent understanding of the codebook size of the feedback information. Further, the UE encodes the feedback information according to the determined codebook size, to obtain encoded feedback information. Optionally, the codebook size indication information may be first indication information, second indication information, or a combination of the first indication information and the second indication information. The first indication information is information in the downlink control information, and the second indication information is information in uplink scheduling information used for scheduling the PUSCH.

S204. The base station receives, in the uplink subframe according to the determined codebook size of the feedback information, feedback information that is sent by the UE and that is mapped to a physical uplink shared channel (PUSCH).

In this embodiment of the present disclosure, to maintain an uplink single-carrier characteristic of an LTE system, the UE maps the encoded feedback information to the physical uplink shared channel (PUSCH), and sends both the uplink data and the encoded feedback information to the base station in the uplink subframe using the PUSCH. Correspondingly, the base station receives, in the uplink subframe according to the determined codebook size of the feedback information, the uplink data and the feedback information that are sent by the UE. Optionally, the feedback information may be information obtained after the UE encodes the feedback information according to the codebook size.

In this embodiment of the present disclosure, a base station sends downlink data to user equipment (UE), and further, the base station determines an uplink subframe used for receiving feedback information that is sent by the UE and that is corresponding to the downlink data. A first downlink subframe set associated with the uplink subframe includes a first subset and a second subset, and the first subset is a proper subset of the second subset. Further, the base station determines a codebook size of the feedback information. The codebook size is a first codebook size or a second codebook size, the first codebook size is corresponding to a quantity of downlink subframes included in the first subset, and the second codebook size is corresponding to a quantity of downlink subframes included in the second subset. Further, the base station receives, in the uplink subframe according to the determined codebook size of the feedback information, feedback information that is sent by the UE and that is mapped to a physical uplink shared channel (PUSCH). Therefore, the codebook size of the feedback information may be determined according to a status of a downlink subframe actually scheduled by the base station. In this way, a PUSCH can carry ACK/NACK information of more bits, and performance of an ACK/NACK and performance of uplink data in the PUSCH are improved when a predetermined quantity of resources are used, or resource overheads are reduced when it is ensured that performance of an ACK/NACK is the same as performance of uplink data in the PUSCH.

Optionally, a specific process in which after determining the codebook size of the feedback information, the base station notifies the UE of the determined codebook size of the feedback information using the codebook size indication information is as follows.

Optionally, before step S204, the method further includes: the base station sends first indication information, to notify the UE of the determined codebook size of the feedback information; or if the base station does not send first indication information to the UE, the base station determines that the codebook size of the feedback information is the first codebook size.

In this embodiment of the present disclosure, the base station sends the first indication information (that is, the codebook size indication information) to the UE, to notify the UE of the determined codebook size of the feedback information. The codebook size that is of the feedback information and that is determined by the base station is the first codebook size or the second codebook size. Optionally, if the base station determines that the codebook size of the feedback information is the first codebook size, the base station sends the first indication information, to notify the UE of the determined first codebook size (that is, the first indication information indicates that the codebook size that is of the feedback information and that is determined by the base station is the first codebook size), so that the UE determines, according to the first indication information, that the codebook size of the feedback information is the first codebook size. If the base station does not send the first indication information to the UE, for example, for an FDD system, when the base station sends, to the UE, only a primary PDCCH used for scheduling a PDSCH on a primary component carrier (that is, the primary PDCCH does not include the first indication information), or for a TDD system, when the base station sends, to the UE, only a primary PDCCH used for scheduling a PDSCH on a primary component carrier and DAI=1 in the primary PDCCH (that is, the primary PDCCH does not include the first indication information), the codebook size that is of the feedback information and that is determined by the base station is the first codebook size (correspondingly, if the UE does not receive the first indication information, the UE directly determines that the codebook size of the feedback information is the first codebook size).

Optionally, for a specific indication manner of the first indication information, refer to a part about an indication manner of the first indication information in descriptions of determining the codebook size of the feedback information by the UE according to the first indication information. Details are not described herein again.

Optionally, before step S204, the method further includes: the base station sends second indication information, to notify the UE of the determined codebook size of the feedback information; or if the base station does not send second indication information to the UE, the base station determines that the codebook size of the feedback information is a predefined codebook size, and the predefined codebook size is the first codebook size or the second codebook size.

In this embodiment of the present disclosure, the base station sends the second indication information (that is, the codebook size indication information) to the UE, to notify the UE of the determined codebook size of the feedback information. The codebook size that is of the feedback information and that is determined by the base station is the first codebook size or the second codebook size. Optionally, if the base station determines that the codebook size of the feedback information is the first codebook size, the base station sends the second indication information, to notify the UE of the determined first codebook size (that is, the second indication information indicates that the codebook size that is of the feedback information and that is determined by the base station is the first codebook size), so that the UE determines, according to the second indication information, that the codebook size of the feedback information is the first codebook size. If the base station does not send the second indication information to the UE, the base station determines that the codebook size of the feedback information is the predefined codebook size, and the predefined codebook size is the first codebook size or the second codebook size.

Optionally, for a specific indication manner of the second indication information, refer to a part about an indication manner of the second indication information in descriptions of determining the codebook size of the feedback information by the UE according to the second indication information. Details are not described herein again.

Optionally, before step S204, the method further includes: the base station sends first indication information and second indication information, to notify the UE of the determined codebook size of the feedback information; or if the base station does not send first indication information to the UE, the base station determines that the codebook size of the feedback information is the first codebook size; or if the base station does not send first indication information to the UE, the base station sends second indication information, to notify the UE of the determined codebook size of the feedback information; or if the base station neither sends first indication information nor sends second indication information to the UE, the base station determines that the codebook size of the feedback information is the first codebook size.

In this embodiment of the present disclosure, the base station sends the first indication information and the second indication information (that is, the codebook size indication information) to the UE, to notify the UE of the determined codebook size of the feedback information. Optionally, the first indication information is information in the downlink control information. For example, the first indication information is information in downlink control information used for scheduling a downlink subframe in the first downlink subframe set. For a specific indication manner of the first indication information, refer to a part about an indication manner of the first indication information in descriptions of determining the codebook size of the feedback information by the UE according to the first indication information. Details are not described herein again. Optionally, the second indication information is information in uplink scheduling information used for scheduling the PUSCH. For example, the second indication information is indication information in a control channel (that is, an uplink scheduling grant) for scheduling a PUSCH that is currently used to carry an ACK/NACK and uplink data. Optionally, the second indication information may indicate a codebook size using an indicator field of a UL_DAI, an indicator field of a UL_index, or a newly-added bit. For example, the second indication information may indicate the codebook size of the feedback information using one newly-added bit or one bit in current two bits of the UL_DAI, or may indicate codebook sizes of more levels using at least two bits. Optionally, parsing information of each state of a corresponding bit field used for indicating the first indication information and the second indication information is pre-configured for the UE, so that when receiving the first indication information and/or the second indication information sent by the base station, the UE determines, according to the corresponding bit field and the pre-configured parsing information, the codebook size that is of the feedback information and that is indicated by the base station.

In this embodiment of the present disclosure, it is assumed that the first indication information is represented using two bits, four bit states of the first indication information are {00, 01, 10, 11}, and corresponding parsing information is separately {first codebook size, first codebook size, second codebook size, second codebook size}. It is assumed that the second indication information is represented using one bit, two states of the one bit are separately {0, 1}, and corresponding parsing information is separately {first codebook size, second codebook size}. (1) If the base station determines that the codebook size of the feedback information is the first codebook size, the base station sends the first indication information, to notify the UE of the determined codebook size of the feedback information. Optionally, a state of the two bits is {00} and a state of the one bit is {0}. (2) If the base station does not send the first indication information to the UE, the base station determines that the codebook size of the feedback information is the first codebook size. (3) If the base station determines that the codebook size of the feedback information is the first codebook size, and the base station does not send the first indication information to the UE, the base station sends the second indication information, to notify the UE of the determined codebook size of the feedback information. Optionally, a state of the one bit is {0}. (4) If the base station does not send the first indication information or the second indication information to the UE, the base station determines that the codebook size of the feedback information is the first codebook size, and correspondingly, if the UE does not receive the first indication information or the second indication information, the UE determines that the codebook size of the feedback information is the first codebook size (that is, the codebook size determined by the base station is consistent with the codebook size determined on the UE side).

Optionally, the two bit states of the one bit may be further divided based on the first codebook size or the second codebook size indicated by the first indication information (optionally, the second indication information may further indicate a third codebook size). If a bit state of the first indication information is 10, the second codebook size is indicated (that is, the first indication information indicates the second codebook size) (specifically, the second codebook size is corresponding to the second subset). (1) In this case, if a bit state of the second indication information is 0, according to the second codebook size indicated by the first indication information, it indicates that the codebook size that is of the feedback information and that is determined by the base station is the second codebook size. (2) In this case, if a bit state of the second indication information is 1, it may indicate that the codebook size that is of the feedback information and that is determined by the base station is a third codebook size that is less than the second codebook size but is greater than the first codebook size. The third codebook size is determined according to a quantity of downlink subframes included in a third subset. The third subset may be a subset of the second subset, and the quantity of downlink subframes included in the third subset is greater than the quantity of downlink subframes included in the first subset. A downlink subframe included in the third subset is different from that in the first subset. Optionally, the third subset may include the first subset, or may partially overlap with the first subset, or even does not overlap with the first subset.

Optionally, the second indication information may further indicate a fourth codebook size, and details are as follows: The base station may not send the first indication information to the UE in some cases, and the codebook size of the feedback information may be determined according to two solutions in this case. (1) Solution 1: The base station directly determines that the codebook size of the feedback information is the first codebook size (the codebook size determined by the base station is consistent with a codebook size determined on the UE side). (2) Solution 2: The base station sends the second indication information, to notify the UE of the determined codebook size of the feedback information, so that the UE determines the codebook size of the feedback information according to the second indication information. Optionally, the second indication information may indicate a codebook size using an indicator field of a UL_DAI, an indicator field of a UL_index, or a newly-added bit. For example, the second indication information may indicate the codebook size of the feedback information using one newly-added bit or one bit in current two bits of the UL_DAI, or may indicate codebook sizes of more levels using at least two bits. Optionally, parsing information of each state of a corresponding bit field used for indicating the second indication information is pre-configured for the UE, so that when the UE does not receive the first indication information but receives the second indication information that is sent by the base station and that is used for notifying the UE of the codebook size that is of the feedback information and that is determined by the base station, the UE may determine the codebook size of the feedback information according to the corresponding bit field and the pre-configured parsing information. For example, when the second indication information is represented using one bit, two states of the one bit are separately {0, 1}, and corresponding parsing information is separately {first codebook size, fourth codebook size}. If the base station determines that the codebook size of the feedback information is the first codebook size, the base station sets a state of the one bit in the uplink scheduling information (that is, the second indication information) to 0. Based on the pre-configured information, if the UE receives the second indication information, the UE may determine, according to the second indication information, that the codebook size of the feedback information is the first codebook size.

Further, in this embodiment of the present disclosure, to resolve a problem that the UE and the base station have inconsistent understandings of the codebook size of the feedback information because the UE may miss detecting a control channel, the encoded feedback information is scrambled using different scrambling codes, so that the base station can learn, by performing descrambling processing using different scrambling codes, the codebook size that is of the feedback information and that is used when the UE encodes the feedback information. In this way, the problem that the base station and the UE have inconsistent understandings of the codebook size of the feedback information is avoided.

Optionally, before step S204, the method further includes: the base station performs descrambling processing on a first scrambling code, and the first scrambling code is used by the UE to scramble encoded feedback information when it is determined that the codebook size of the feedback information is the first codebook size; or the base station performs descrambling processing on a second scrambling code, and the second scrambling code is used by the UE to scramble encoded feedback information when it is determined that the codebook size of the feedback information is the second codebook size. The encoded feedback information is information obtained by encoding the feedback information by the UE according to the codebook size. Therefore, the base station can learn, by performing descrambling processing using different scrambling codes, the codebook size that is of the feedback information and that is determined by the UE, so that the UE and the base station maintain a consistent understanding of the codebook size.

Figure 3:
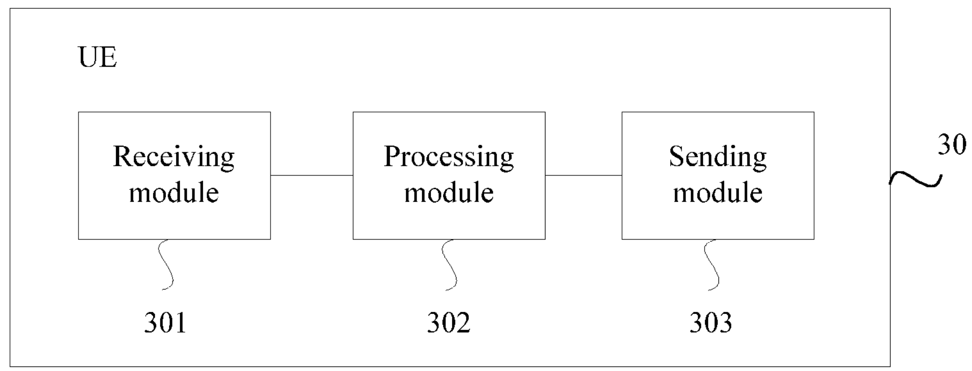
FIG. 3 is a schematic structural diagram of Embodiment 1 of UE according to embodiments of the present disclosure.

FIG. 3 is a schematic structural diagram of Embodiment 1 of UE according to the present disclosure. As shown in FIG. 3, UE 30 provided in this embodiment may include a receiving module 301, a processing module 302, and a sending module 303.

The receiving module 301 is configured to receive downlink data.

The processing module 302 is configured to: determine an uplink subframe used for feeding back feedback information corresponding to the downlink data, and determine a first downlink subframe set associated with the uplink subframe. The downlink data is received by the receiving module, the first downlink subframe set includes a first subset and a second subset, and the first subset is a proper subset of the second subset.

The processing module 302 is further configured to determine a codebook size of the feedback information. The codebook size is a first codebook size or a second codebook size, the first codebook size is corresponding to a quantity of downlink subframes included in the first subset, and the second codebook size is corresponding to a quantity of downlink subframes included in the second subset.

The processing module 302 is further configured to encode the feedback information according to the codebook size, to obtain encoded feedback information.

The processing module 302 is further configured to: map the encoded feedback information to a physical uplink shared channel (PUSCH), and control the sending module 303 to send, in the uplink subframe, the encoded feedback information using the PUSCH.

The sending module 303 is configured to send the encoded feedback information to the base station in the uplink subframe using the PUSCH.

Optionally, the processing module is specifically configured to: if first indication information sent by the base station is received, and the first indication information indicates the first codebook size, determine that the codebook size of the feedback information is the first codebook size; or if first indication information sent by the base station is received, and the first indication information indicates the second codebook size, determine that the codebook size of the feedback information is the second codebook size; or if first indication information is not received, determine that the codebook size of the feedback information is the first codebook size.

Optionally, the processing module is specifically configured to: if second indication information sent by the base station is received, and the second indication information indicates the first codebook size, determine that the codebook size of the feedback information is the first codebook size; or if second indication information sent by the base station is received, and the second indication information indicates the second codebook size, determine that the codebook size of the feedback information is the second codebook size; or if second indication information is not received, determine that the codebook size of the feedback information is a predefined codebook size, where the predefined codebook size is the first codebook size or the second codebook size.

Optionally, the processing module is specifically configured to: if first indication information and second indication information that are sent by the base station are received, and the first indication information and the second indication information indicate the first codebook size, determine that the codebook size of the feedback information is the first codebook size; or if first indication information and second indication information that are sent by the base station are received, and the first indication information and the second indication information indicate the second codebook size, determine that the codebook size of the feedback information is the second codebook size; or if first indication information is not received, determine that the codebook size of the feedback information is the first codebook size; or if first indication information is not received, but second indication information is received, determine that the codebook size of the feedback information is the first codebook size or the second codebook size indicated by the second indication information; or if first indication information and second indication information are not received, determine that the codebook size of the feedback information is the first codebook size.

Optionally, the receiving module is specifically configured to receive, in a downlink subframe scheduled by the base station, the downlink data. The downlink subframe scheduled by the base station constitutes a second downlink subframe set, and the second downlink subframe set is a subset of the first downlink subframe set.

The processing module is specifically configured to: if the second downlink subframe set is a subset of the first subset, determine that the codebook size of the feedback information is the first codebook size; or if the second downlink subframe set includes only a downlink subframe that is in the second subset and that does not belong to the first subset, determine that the codebook size of the feedback information is the first codebook size or the second codebook size; or if the second downlink subframe set includes a downlink subframe in the first subset and a downlink subframe that is in the second subset and that does not belong to the first subset, and the second downlink subframe set does not include a downlink subframe beyond the first subset and the second subset, determine that the codebook size of the feedback information is the second codebook size.

Optionally, the processing module is further configured to: if the codebook size is the first codebook size, scramble the encoded feedback information using a first scrambling code; or if the codebook size is the second codebook size, scramble the encoded feedback information using a second scrambling code.

Optionally, the processing module is further configured to: if the codebook size is the first codebook size, encode the feedback information according to the first codebook size, to obtain first encoded feedback information; determine a first proportion factor configured by the base station, and determine a first quantity of symbols according to the first proportion factor, where the first quantity of symbols is a quantity of symbols that need to be occupied to map the first encoded feedback information to the PUSCH; and map the first encoded feedback information to the PUSCH according to the first quantity of symbols; or the processing module is further configured to: if the codebook size is the second codebook size, encode the feedback information according to the second codebook size, to obtain second encoded feedback information; determine a second proportion factor configured by the base station, and determine a second quantity of symbols according to the second proportion factor, where the second quantity of symbols is a quantity of symbols that need to be occupied to map the second encoded feedback information to the PUSCH; and map the second encoded feedback information to the PUSCH according to the second quantity of symbols.

Optionally, the receiving module is further configured to: receive downlink control information sent by the base station; and receive, in the downlink subframe scheduled by the base station, the downlink data according to the downlink control information.

The first indication information is information in the downlink control information.

Optionally, the second indication information is information in uplink scheduling information used for scheduling the PUSCH.

The UE in this embodiment may be configured to execute the technical solution in Embodiment 1 of the foregoing feedback information transmission method in the communications system in the present disclosure. Implementation principles and technical effects thereof are similar, and details are not described herein again.

Figure 4:
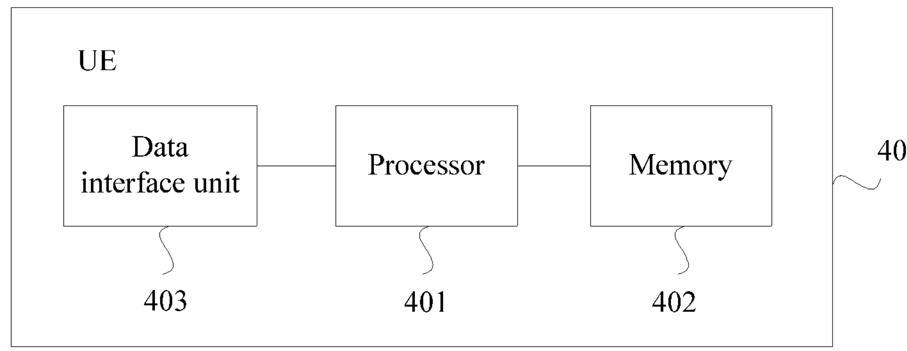
FIG. 4 is a schematic structural diagram of Embodiment 2 of UE according to embodiments of the present disclosure.

FIG. 4 is a schematic structural diagram of Embodiment 2 of UE according to the present disclosure. As shown in FIG. 4, UE 40 provided in this embodiment may include a processor 401 and a memory 402. The UE 40 may further include a data interface unit 403, and the data interface unit 403 may be connected to the processor 401. The data interface unit 403 is configured to receive/send data or information, and the memory 402 is configured to store an execution instruction. When the UE 40 runs, the processor 401 communicates with the memory 402, and the processor

401 invokes the execution instruction in the memory 402, to execute the technical solution in Embodiment 1 of the foregoing feedback information transmission method in the communications system. Implementation principles and technical effects thereof are similar, and details are not described herein again. The foregoing processing module 302 may be implemented by the processor 401. The foregoing sending module 303 and the foregoing receiving module 301 may be implemented by the data interface unit 403, or may be implemented by a transceiver, a transmitter, a receiver, or the like.

Figure 5:
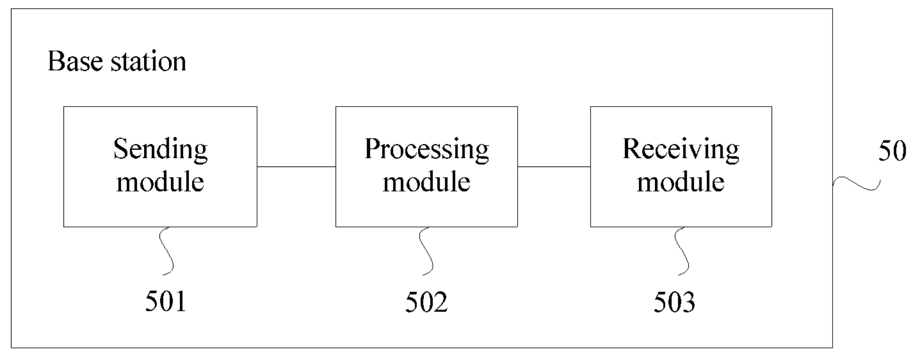
FIG. 5 is a schematic structural diagram of Embodiment 1 of a base station according to embodiments of the present disclosure.

FIG. 5 is a schematic structural diagram of Embodiment 1 of a base station according to the present disclosure. As shown in FIG. 5, a base station 50 provided in this embodiment may include a sending module 501, a processing module 502, and a receiving module 503.

The sending module 501 is configured to send downlink data to user equipment (UE).

The processing module 502 is configured to determine an uplink subframe used for receiving feedback information that is sent by the UE and that is corresponding to the downlink data. The downlink data is sent by the sending module, a first downlink subframe set associated with the uplink subframe includes a first subset and a second subset, and the first subset is a proper subset of the second subset.

The processing module 502 is further configured to determine a codebook size of the feedback information. The codebook size is a first codebook size or a second codebook size, the first codebook size is corresponding to a quantity of downlink subframes included in the first subset, and the second codebook size is corresponding to a quantity of downlink subframes included in the second subset.

The receiving module 503 is configured to receive, in the uplink subframe according to the codebook size that is of the feedback information and that is determined by the processing module, feedback information that is sent by the UE and that is mapped to a physical uplink shared channel (PUSCH).

Optionally, the sending module is further configured to send first indication information, to notify the UE of the determined codebook size of the feedback information; or if the sending module does not send first indication information to the UE, the processing module determines that the codebook size of the feedback information is the first codebook size.

Optionally, the sending module is further configured to send second indication information, to notify the UE of the determined codebook size of the feedback information; or if the sending module does not send second indication information to the UE, the processing module determines that the codebook size of the feedback information is a predefined codebook size. The predefined codebook size is the first codebook size or the second codebook size.

Optionally, the sending module is further configured to send first indication information and second indication information, to notify the UE of the determined codebook size of the feedback information; or if the sending module does not send first indication information to the UE, the processing module determines that the codebook size of the feedback information is the first codebook size; or if the sending module does not send first indication information to the UE, the sending module sends second indication information, to notify the UE of the determined codebook size of the feedback information; or if the sending module neither sends first indication information nor sends second indication information to the UE, the processing module determines that the codebook size of the feedback information is the first codebook size.

Optionally, the processing module is further configured to: perform descrambling processing on a first scrambling code, where the first scrambling code is used by the UE to scramble encoded feedback information when it is determined that the codebook size of the feedback information is the first codebook size; or perform descrambling processing on a second scrambling code, where the second scrambling code is used by the UE to scramble encoded feedback information when it is determined that the codebook size of the feedback information is the second codebook size.

The encoded feedback information is information obtained by encoding the feedback information by the UE according to the codebook size.

Optionally, the sending module is further configured to: send downlink control information to the UE, and send the downlink data to the UE in a downlink subframe scheduled by the base station.

The first indication information is information in the downlink control information.

Optionally, the second indication information is information in uplink scheduling information used for scheduling the PUSCH.

The base station in this embodiment may be configured to execute the technical solution in Embodiment 2 of the foregoing feedback information transmission method in the communications system in the present disclosure. Implementation principles and technical effects thereof are similar, and details are not described herein again.

Figure 6:
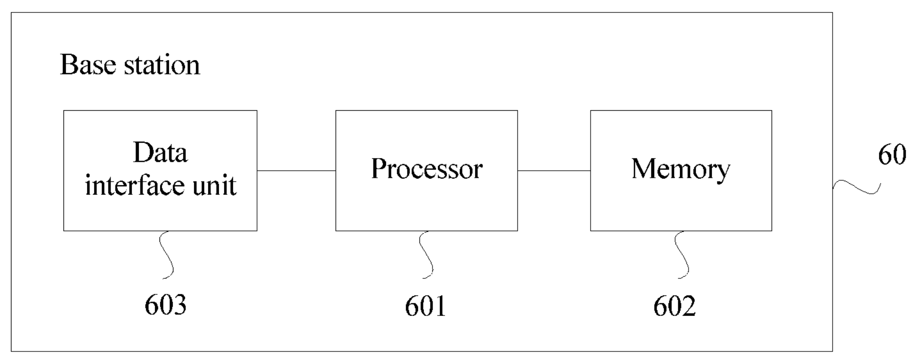
FIG. 6 is a schematic structural diagram of Embodiment 2 of a base station according to embodiments of the present disclosure.

FIG. 6 is a schematic structural diagram of Embodiment 2 of a base station according to the present disclosure. As shown in FIG. 6, a base station 60 provided in this embodiment may include a processor 601 and a memory 602. The base station 60 may further include a data interface unit 603, and the data interface unit 603 may be connected to the processor 601. The data interface unit 603 is configured to receive/send data or information, and the memory 602 is configured to store an execution instruction. When the base station 60 runs, the processor 601 communicates with the memory 602, and the processor 601 invokes the execution instruction in the memory 602, to execute the technical solution in Embodiment 2 of the foregoing feedback information transmission method in the communications system. Implementation principles and technical effects thereof are similar, and details are not described herein again.

The memory 602 stores a program. Specifically, the program may include program code, and the program code includes a computer operation instruction. Optionally, the memory 602 may include a random access memory (RAM), and may further include a non-volatile memory, for example, at least one magnetic disk memory.

The data interface unit 603 includes a receiving/sending unit.

The foregoing processing module 502 may be implemented by the processor 601. The foregoing sending module 501 and the foregoing receiving module 503 may be implemented by the data interface unit 603, or may be implemented by a transceiver, a transmitter, a receiver, or the like.

In this embodiment of the present disclosure, the processor may be a general purpose processor, including a central processing unit (CPU), a network processor (NP), and the like; or may be a digital signal processor (DSP), an application-specific integrated circuit (ASIC), a field programmable gate array (FPGA), another programmable logic component, a discrete gate, a transistor logic component, or a discrete hardware component.

Persons of ordinary skill in the art may understand that all or some of the steps of the foregoing method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method, comprising:

receiving, by user equipment (UE), downlink data;

determining, by the UE, an uplink subframe for feeding back feedback information corresponding to the downlink data;

determining a first downlink subframe set associated with the uplink subframe; and determining, by the UE, a codebook size of the feedback information, wherein the codebook size of the feedback information is a first codebook size or a second codebook size;

when the codebook size is the first codebook size, encoding, by the UE, the feedback information according to the first codebook size, to obtain first encoded feedback information, and determining, by the UE, a first quantity of symbols according to a first proportion factor, wherein the first quantity of symbols indicates a quantity of symbols that will be occupied when the first encoded feedback information is mapped to a physical uplink shared channel (PUSCH); and when the codebook size is the second codebook size, encoding, by the UE, the feedback information according to the second codebook size, to obtain second encoded feedback information, and determining, by the UE, a second quantity of symbols according to a second proportion factor, wherein the second quantity of symbols indicates a quantity of symbols that will be occupied when the second encoded feedback information is mapped to the PUSCH; and wherein the first proportion factor and the second proportion factor are independently configured.

2. The method according to claim 1, wherein the first downlink subframe set comprises a first subset and a second subset, the first codebook size corresponds to a quantity of downlink subframes comprised in the first subset, and the second codebook size corresponds to a quantity of downlink subframes comprised in the second subset, and wherein the method further comprises:

determining, by the UE, at least one downlink subframe according to a carrier number or a subframe number, wherein the at least one downlink subframe belongs to the first subset or the second subset.

3. The method according to claim 2, wherein the at least one downlink subframe is determined first according to a frequency-domain carrier number and then according to a time-domain subframe number.

4. The method according to claim 2, wherein:

the quantity of downlink subframes in the first subset is not greater than an acknowledgment (ACK)/negative acknowledgment (NACK) bit quantity threshold; or the quantity of downlink subframes in the second subset is greater than the ACK/NACK bit quantity threshold.

5. The method according to claim 2, wherein the first subset is a proper subset of the second subset, or the first subset partially overlaps with the second subset.

6. The method according to claim 1, further comprising:

receiving, by the UE, first indication information sent by a base station;

wherein determining, by the UE, the codebook size of the feedback information comprises:

when the first indication information indicates the first codebook size, determining, by the UE, that the codebook size of the feedback information is the first codebook size; and when the first indication information indicates the second codebook size, determining, by the UE, that the codebook size of the feedback information is the second codebook size.

7. An apparatus, comprising:

one or more processors, and a non-transitory storage medium configured to store program instructions;

wherein, when executed by the one or more processors, the program instructions cause the apparatus to:

receive downlink data;

determine an uplink subframe for feeding back feedback information corresponding to the downlink data;

determine a first downlink subframe set associated with the uplink subframe;

determine a codebook size of the feedback information, wherein the codebook size of the feedback information is a first codebook size or a second codebook size;

when the codebook size is the first codebook size, encode the feedback information according to the first codebook size, to obtain first encoded feedback information, and determine a first quantity of symbols according to a first proportion factor, wherein the first quantity of symbols indicates a quantity of symbols that will be occupied when the first encoded feedback information is mapped to a physical uplink shared channel (PUSCH); and when the codebook size is the second codebook size, encode the feedback information according to the second codebook size, to obtain second encoded feedback information, and determine a second quantity of symbols according to a second proportion factor, wherein the second quantity of symbols indicates a quantity of symbols that will be occupied when the second encoded feedback information is mapped to the PUSCH; and wherein the first proportion factor and the second proportion factor are independently configured.

8. The apparatus according to claim 7, wherein the first downlink subframe set comprises a first subset and a second subset, the first codebook size corresponds to a quantity of downlink subframes comprised in the first subset, and the second codebook size corresponds to a quantity of downlink subframes comprised in the second subset; and wherein when executed by the one or more processors the program instructions further cause the apparatus to:

determine at least one downlink subframe according to a carrier number or a subframe number, wherein the at least one downlink subframe belongs to the first subset or the second subset.

9. The apparatus according to claim 8, wherein the at least one downlink subframe is determined first according to a frequency-domain carrier number and then according to a time-domain subframe number.

10. The apparatus according to claim 8, wherein:

the quantity of downlink subframes in the first subset is not greater than an acknowledgment (ACK)/negative acknowledgement (NACK) bit quantity threshold; or the quantity of downlink subframes in the second subset is greater than the ACK/NACK bit quantity threshold.

11. The apparatus according to claim 8, wherein the first subset is a proper subset of the second subset, or the first subset partially overlaps with the second subset.

12. The apparatus according to claim 7, wherein when executed by the one or more processors the program instructions further cause the apparatus to:

receive first indication information sent by a base station;

wherein when the first indication information indicates the first codebook size, determining the codebook size of the feedback information further comprises determining that the codebook size of the feedback information is the first codebook size; and wherein when the first indication information indicates the second codebook size, the determining the codebook size of the feedback information further comprises determining that the codebook size of the feedback information is the second codebook size.

13. A method, comprising:

sending, by a base station, downlink data to user equipment (UE);

determining, by the base station, an uplink subframe for receiving feedback information from the UE, wherein the uplink subframe corresponds to the downlink data, and a first downlink subframe set is associated with the uplink subframe;

determining, by the base station, a codebook size of the feedback information, wherein the codebook size of the feedback information is a first codebook size or a second codebook size;

when the codebook size is the first codebook size, configuring, by the base station, a first proportion factor for the UE to use to determine a first quantity of symbols, and receiving, by the base station according to the first quantity of symbols and the first codebook size, the feedback information; and when the codebook size is the second codebook size, configuring, by the base station, a second proportion factor for the UE to use to determine a second quantity of symbols, and receiving, by the base station according to the second quantity of symbols and the second codebook size, the feedback information.

14. The method according to claim 13, further comprising:

sending, by the base station, first indication information to the UE, wherein the first indication information indicates the first codebook size or the second codebook size.

15. The method according to claim 13, wherein the first downlink subframe set comprises a first subset and a second subset, the first codebook size corresponds to a quantity of downlink subframes comprised in the first subset, and the second codebook size corresponds to a quantity of downlink subframes comprised in the second subset; and wherein:

the quantity of downlink subframes in the first subset is not greater than an acknowledgment (ACK)/negative acknowledgment (NACK) bit quantity threshold; or the quantity of downlink subframes in the second subset is greater than the ACK/NACK bit quantity threshold.

16. The method according claim 15, wherein the first subset is a proper subset of the second subset, or the first subset partially overlaps with the second subset.

17. An apparatus, comprising:

one or more processors, and a non-transitory storage medium configured to store program instructions;

wherein, when executed by the one or more processors, the program instructions cause the apparatus to:

send downlink data to user equipment (UE);

determine an uplink subframe for receiving feedback information from the UE, wherein the uplink subframe corresponds to the downlink data, and a first downlink subframe set is associated with the uplink subframe;

determine a codebook size of the feedback information, wherein the codebook size is a first codebook size or a second codebook size;

when the codebook size is the first codebook size, configure a first proportion factor for the UE to use to determine a first quantity of symbols, and receive, according to the first quantity of symbols and the first codebook size, the feedback information; and when the codebook size is the second codebook size, configure a second proportion factor for the UE to use to determine a second quantity of symbols, and receive, according to the second quantity of symbols and the second codebook size, the feedback information.

18. The apparatus according to claim 17, wherein when executed by the one or more processors the program instructions further cause the apparatus to:

send a first indication information to the UE, wherein the first indication information indicates the first codebook size or the second codebook size.

19. The apparatus according to claim 17, wherein the first downlink subframe set comprises a first subset and a second subset, the first codebook size corresponds to a quantity of downlink subframes comprised in the first subset, and the second codebook size corresponds to a quantity of downlink subframes comprised in the second subset; and wherein:

the quantity of downlink subframes in the first subset is not greater than an acknowledgment (ACK)/negative acknowledgment (NACK) bit quantity threshold; or the quantity of downlink subframes in the second subset is greater than the ACK/NACK bit quantity threshold.

20. The apparatus according claim 19, wherein the first subset is a proper subset of the second subset, or the first subset partially overlaps with the second subset.

* * * * *